(12) United States Patent
Okada et al.

(10) Patent No.: US 6,900,852 B2
(45) Date of Patent: May 31, 2005

(54) ACTIVE MATRIX LIQUID CRYSTAL DISPLAY ELEMENT

(75) Inventors: Takashi Okada, Osaka (JP); Yukio Tanaka, Kyoto (JP); Masanori Kimura, Osaka (JP); Katsuhiko Kumagawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 10/058,837

(22) Filed: Jan. 30, 2002

(65) Prior Publication Data

US 2002/0113913 A1 Aug. 22, 2002

(30) Foreign Application Priority Data

Jan. 31, 2001 (JP) .......................................... 2001-022964

(51) Int. Cl.[7] .............................................. G02F 1/1343
(52) U.S. Cl. .......................................... 349/39; 349/38
(58) Field of Search ............................. 349/38, 39, 155

(56) References Cited

U.S. PATENT DOCUMENTS

| 5,691,793 A | * 11/1997 | Watanabe et al. ........... 349/155 |
| 6,411,347 B1 | * 6/2002 | Park et al. .................... 349/39 |

FOREIGN PATENT DOCUMENTS

| EP | 0 414 478 | 10/1994 |
| EP | 0 535954 | 4/1998 |
| GB | 2 312 773 | 11/1997 |
| JP | 05-119347 | 5/1993 |
| JP | 05-232509 | 9/1993 |
| JP | 06-067199 | 3/1994 |
| JP | 08-008432 | 1/1996 |
| JP | 10-268350 | 10/1998 |
| JP | 11-084428 | 3/1999 |
| JP | 2000-002889 | 1/2000 |

* cited by examiner

Primary Examiner—Toan Ton
Assistant Examiner—Jeanne Andrea Di Grazio
(74) Attorney, Agent, or Firm—McDermott Will & Emery LLP

(57) ABSTRACT

An active matrix liquid crystal display element capable of reducing flicker comprises: a plurality of source lines; a plurality of gate lines arranged so as to intersect the plurality of source lines in a plan view, for transmitting a gate signal; a plurality of pixels defined by the plurality of source lines and the plurality of gate lines, constituting an image display plane; a pixel electrode provided for every pixel; an opposed electrode facing the pixel electrode across a liquid crystal layer; a storage capacitor for holding a voltage applied between its corresponding pixel electrode and the opposed electrode; and a pixel transistor having a source electrode, a drain electrode and a gate electrode which are connected to a corresponding one of the source lines, a corresponding one of the pixel electrodes and a corresponding one of the gate lines respectively, and being turned ON or OFF by the gate signal, wherein an index B given by B=Lst/Lgd is equal to or greater than 7, where a periphery length of the storage capacitor is Lst and a periphery length of a gate electrode to pixel electrode capacitor of the pixel transistor is Lgd.

16 Claims, 24 Drawing Sheets

Cst/Clc=0.5

| | Cst(pF) | Lst(μm) | A | B | B' | D | Vts(V) | X |
|---|---|---|---|---|---|---|---|---|
| PRIOR ART | 0.05 | 150 | 0.063 | 6.0 | 7.0 | 0.44 | 1.56 | 0.064 |
| MINIMUM VALUE | 0.05 | 282 | 0.063 | 11.3 | 12.3 | 0.77 | 1.56 | 0.064 |
| OPTIMUM VALUE | 0.05 | 375 | 0.063 | 15.0 | 16.0 | 1.00 | 1.56 | 0.000 |
| MAXIMUM VALUE | 0.05 | 481 | 0.063 | 19.2 | 20.2 | 1.27 | 1.56 | 0.064 |

Fig. 6a

Cst/Clc=1 (NORMAL VALUE)

| | Cst(pF) | Lst(μm) | A | B | B' | D | Vts(V) | X |
|---|---|---|---|---|---|---|---|---|
| PRIOR ART | 0.10 | 150 | 0.048 | 6.0 | 7.0 | 0.33 | 1.19 | 0.084 |
| MINIMUM VALUE | 0.10 | 342 | 0.048 | 13.7 | 14.7 | 0.70 | 1.19 | 0.084 |
| OPTIMUM VALUE | 0.10 | 500 | 0.048 | 20.0 | 21.0 | 1.00 | 1.19 | 0.000 |
| MAXIMUM VALUE | 0.10 | 687 | 0.048 | 27.5 | 28.5 | 1.36 | 1.19 | 0.084 |

Fig. 6b

Cst/Clc=1.5

| | Cst(pF) | Lst(μm) | A | B | B' | D | Vts(V) | X |
|---|---|---|---|---|---|---|---|---|
| PRIOR ART | 0.15 | 150 | 0.038 | 6.0 | 7.0 | 0.27 | 0.96 | 0.104 |
| MINIMUM VALUE | 0.15 | 387 | 0.038 | 15.5 | 16.5 | 0.63 | 0.96 | 0.104 |
| OPTIMUM VALUE | 0.15 | 625 | 0.038 | 25.0 | 26.0 | 1.00 | 0.96 | 0.000 |
| MAXIMUM VALUE | 0.15 | 918 | 0.038 | 36.7 | 37.7 | 1.45 | 0.96 | 0.104 |

Fig. 6c

| CODE | VALUE | PARAMETER |
|---|---|---|
| Y(V) | 0.1 | DC OFFSET ALLOWABLE VALUE |
| Clc(pF) | 0.1 | LIQUID CRYSTAL CAPACITANCE |
| Cof(pF) | 0.01 | TFT GATE TO DRAIN CAPACITANCE VALUE |
| Lof($\mu m$) | 25 | THE PERIPHERAL LENGTH OF THE PATTERN FORMING Cof |
| Sof($\mu m^2$) | 36 | THE AREA OF THE PATTERN FORMING Cof |
| $\Delta W(\mu m)$ | 0.5 | DEVIATION OF THE WIDTHS OF PATTERNS WITHIN THE PANEL PLANE |
| $\Delta Sof(\mu m^2)$ | 12.5 | DEVIATION OF THE AREA OF THE PATTERN FORMING Cof |
| E | 0.347 | [=$\Delta$Sof/Sof] |
| Vgh(V) | 18 | GATE ON VOLTAGE |
| Vgl(V) | -7 | GATE ON VOLTAGE |

Fig. 7a

| CODE | VALUE | PARAMETER |
|---|---|---|
| Cst(pF) | VARIABLE VALUE | STORAGE CAPACITANCE VALUE |
| Lst($\mu m$) | VARIABLE VALUE | THE PERIPHERAL LENGTH OF THE PATTERN FORMING Cst |
| A | VARIABLE VALUE | [=Cof/(Clc+Cst+Cof)] |
| B | VARIABLE VALUE | [=Lst/Lof] |
| B' | VARIABLE VALUE | [=(Lst+Lof)/Lof] |
| D | VARIABLE VALUE | [=A×B'] |
| Vts(V) | VARIABLE VALUE | [=A×(Vgh-Vgl)] |
| X | VARIABLE VALUE | [=Y/Vts] |
| Dmin | VARIABLE VALUE | [=(E-X)-(E·(1+X))] |
| D0 | VARIABLE VALUE | [=1] (THE VALUE OF D WHEN X = 0) |
| Dmax | VARIABLE VALUE | [=(E+X)-(E·(1-X))] |

ACTIVE MATRIX LIQUID CRYSTAL DISPLAY ELEMENT

BACKGROUND OF THE INVENTION

1. Field of the Invention

The present invention relates to an active matrix liquid crystal display element which includes pixel transistors for individually performing writing control on each pixel.

2. Description of the Related Art

With rapid progress in technology for producing large-sized, high-resolution, high-picture-quality liquid crystal display elements (LCD elements), many attempts have been made in recent years to meet various requirements arising in the production of such LCD elements. For improved picture quality, image flicker reduction is particularly important, because flicker becomes an increasingly serious problem in view of the recent trend toward large-sized, high-resolution LCD elements.

More specifically, in an active matrix LCD element, which includes a transistor (hereinafter referred to as "pixel transistor") provided for every pixel for independently controlling writing of a source signal (video signal) in the pixel, the so-called feed-through voltage is generated when a pixel transistor is turned OFF. In an LCD element of a larger size and higher resolution, a pulse input to the gate electrode of each pixel transistor has a substantially rectangular waveform at a supply end thereof (hereinafter referred to as "gate signal supply end"), while it has around waveform at a terminal end thereof (hereinafter referred to as "gate signal terminal end") because of high load, which leads to a noticeable phenomenon called "recharging" at the gate signal terminal end. The generation of the feed-through voltage combined with the recharging phenomenon results in such a situation that where gate lines extend laterally on the image display plane (hereinafter referred to as "screen"), the potential maintained by the pixels on the right side of the screen differs from that on the left side. In this case, when an opposed potential (a potential of an opposed electrode) is determined so as to apply the same voltage to the even numbered frames and odd numbered frames of the LCD element, the value of the opposed potential varies according to locations in the screen. In such a case, the average value is normally set, which causes a shimmering phenomenon called flicker in the locations where the difference between an even numbered frame and an odd numbered frame in the voltage applied to the LCD element exceeds an allowable range. This is a serious drawback in picture quality. An attempt to solve this problem is disclosed, for instance, in Japanese Patent Kokai Publication Nos. 5-232509 (1993) and 11-84428 (1999). According to the attempt, flicker is reduced by setting the values of capacitances of a storage capacitor and a capacitor formed between the gate electrode and pixel electrode of a pixel transistor (hereinafter referred to as "gate electrode to pixel electrode capacitor) so as to slightly vary depending on locations in the screen, based on the fact that they affect the feed-through voltage.

However, even if capacitances of the storage capacitor and the gate electrode to pixel electrode capacitor are set in the manner described above, the actual values of the capacitances sometimes are not equal to their respective design values. Since the feed-through voltage affects the potential which is finally maintained by the pixels and is dependent of the capacitances of the storage capacitor and the gate electrode to pixel electrode capacitor, the potential maintained by the pixels will vary if the values of these capacitances vary. If the potential variation is uniform throughout the screen, flicker can be prevented by simply readjusting the opposed potential so as to apply the same voltage to the even numbered frames and odd numbered frames of the LCD element. On the other hand, in cases where the degree of the potential variation is not uniform within the screen, even if the opposed potential is adjusted so as to apply the same voltage to the even numbered and odd numbered frames of the LCD element, different voltages are unavoidably caused in the even numbered and odd numbered frames of the LCD element in some regions. This is, in consequence, observed as flicker. One of the causes of variations in the capacitances of the storage capacitor and the gate electrode to pixel electrode capacitor is that when forming the patterns of the gate electrodes, pixel electrodes and others which define the capacitance of the storage capacitor and the gate electrode to pixel electrode capacitor, the photomasks for these patterns are improperly aligned so that the area of the overlapped region where these patterns are overlapped through insulating films deviates from its design value. Japanese Patent Kokai Publication Nos. 6-67199 (1994) and 8-8432 (1996) have proposes a method for solving this problem. In these publications, pixel electrodes and gate electrodes intersect each other in cross form so that the values of the capacitances are not affected by the misalignment of the photomasks. An alternative is disclosed, for instance, in Japanese Patent Kokai Publication No. 5-119347 (1993), according to which two transistors are connected in parallel and the first transistor and the second transistor are arranged so as to be connected to the source electrode and the drain electrode respectively, such that the vertical relationship between the source and drain electrodes is reversed, thereby compensating for the misalignment of the photomasks.

The methods described earlier are made on assumption that misalignment occurs only in directions parallel with and perpendicular to the gate lines and are effective as far as misalignment occurs in such directions. In fact, when misalignment occurs only in parallel with or perpendicularly to the gate lines, flicker is unlikely to reach a problematic level so that there is no need to take the above methods. The reason for this is that such misalignment occurs in a uniform manner within the screen in principle and can be basically eliminated by adjusting opposed potential. There are, however, other cases. For instance, since reticles (photomasks) and array substrates (active matrix substrates) have certain temperatures or certain coefficients of mechanical expansion, the variations in the capacitances of the storage capacitor and the gate electrode to pixel electrode capacitor which correspond to misalignment may consequently fluctuate within the screen under a certain condition in which temperature fluctuation, reticle or substrate deflection, or the like occurs. Further, where a pattern for image display regions of an array substrate is formed by repeating exposure a plurality of times with a stepper as shown in Japanese Patent Kokai Publication No. 2000-2889, the degree of misalignment may vary according to the exposed regions. It is conceivable that the above-described methods are suited for use in these cases.

Another major cause of variations in the capacitances of the storage capacitor and the gate electrode to pixel electrode capacitor is deviation of the widths of patterns for the gate electrodes, the pixel electrodes and others from their design values, the deviation being caused by poor controllability in a photolithography or etching process. The above-described conventional methods cannot solve this problem which is more serious than the misalignment of the photomasks.

Up to now, there have been proposed no effective means in design, as a method for solving the above problem. Therefore, increases in flicker are somehow limited to an allowable range by restricting variations in the capacitances of the storage capacitor and the gate electrode to pixel electrode capacitor in the screen by improving the accuracy of photolithography techniques and processing techniques such as dry etching and wet etching in the fabrication process of the array substrate. However, with recent progress in the development of large-sized, high-resolution, high-picture-quality LCD elements, the allowable range for the level of flicker becomes more and more strict so that the conventional processing techniques no longer successfully restrict the level of flicker within the allowable range.

SUMMARY OF THE INVENTION

The present invention is directed to overcoming the problems described earlier and a primary object of the invention is therefore to provide an active matrix liquid crystal display element and active matrix liquid crystal display which are capable of reducing flicker.

The above object can be achieved by an active matrix liquid crystal display element according to the invention comprising: a plurality of source lines for transmitting a video signal; a plurality of gate lines arranged so as to intersect the plurality of source lines in a plan view, for transmitting a gate signal; a plurality of pixels defined by the plurality of source lines and the plurality of gate lines which intersect each other and constituting an image display plane; a pixel electrode provided for every pixel; an opposed electrode facing the pixel electrode across a liquid crystal layer; a storage capacitor provided for every pixel for holding a voltage applied between its corresponding pixel electrode and the opposed electrode; and a pixel transistor provided for every pixel, having a source electrode, a drain electrode and a gate electrode which are connected to a corresponding one of the source lines, a corresponding one of the pixel electrodes and a corresponding one of the gate lines respectively, and being turned ON or OFF by the gate signal, wherein an index B given by $B=Lst/Lgd$ is equal to or greater than 7, where a periphery length of the storage capacitor is Lst and a periphery length of a gate electrode to pixel electrode capacitor, which is a capacitor formed between the gate electrode of the pixel transistor and pixel electrode, is Lgd. To maintain the feed-through voltage within the image display plane at a constant value, the index B, that is, $Lst/Lgd$ may be twice the ratio of the capacitance value of the storage capacitor to the capacitance value of the gate electrode to pixel electrode capacitor. The optimum value and allowable value of the index B are about 15 to 25 and about 11 to 37, respectively. On the other hand, the index B of the prior art is about 6 at the most. By virtue of this arrangement, the fluctuation of the feed-through voltage within the image display plane can be restricted so that flicker can be reduced, as far as the index value B does not exceed its upper limit to an extreme extent.

The index B may be substantially ranges from 11 to 37. This enables adequate flicker reduction.

A periphery length Lof of the gate electrode to pixel electrode capacitor when the pixel transistor is in its non-continuity state may be used as Lgd and the index B may be given by $B=Lst/Lof$. This enables flicker reduction by use of the simple index B.

A periphery length Lon of the gate electrode to pixel electrode capacitor when the pixel transistor is in its continuity state may be used as Lgd and the index B may be given by $B=Lst/Lon$. With this arrangement, flicker reduction by use of the simple index B is possible for LCD elements having no gate electrode to pixel electrode capacitor in the non-continuity state.

According to the invention, there is provided an active matrix LCD element comprising: a plurality of source lines for transmitting a video signal; a plurality of gate lines arranged so as to intersect the plurality of source lines in a plan view for transmitting a gate signal; a plurality of pixels defined by the plurality of source lines and the plurality of gate lines which intersect each other and constituting an image display plane; a pixel electrode provided for every pixel; an opposed electrode facing the pixel electrode across a liquid crystal layer; a storage capacitor provided for every pixel for holding a voltage applied between its corresponding pixel electrode and the opposed electrode; and a pixel transistor provided for every pixel, having a source electrode, a drain electrode and a gate electrode which are connected to a corresponding one of the source lines, a corresponding one of the pixel electrodes and a corresponding one of the gate lines respectively, and being turned ON or OFF by the gate signal, wherein an index D given by $D=[Cof/(Clc+Cst+Cof)]\times[(Lst+Lof)/Lof]$ substantially ranges from 0.6 to 1.5, where the value of capacitance between the pixel electrode and the opposed electrode which face each other across the liquid crystal layer is Clc, the capacitance value of the storage capacitor is Cst, the capacitance value of a gate electrode to pixel electrode capacitor, which is a capacitor formed between the gate electrode and the pixel electrode, when the pixel transistor is in its non-continuity state is Cof, the periphery of the storage capacitor is Lst, and the periphery of the gate electrode to pixel electrode capacitor when the pixel transistor is in its non-continuity state is Lof. This enables adequate flicker reduction by use of the simple index D.

According to the invention, there is provided an active matrix LCD element comprising: a plurality of source lines for transmitting a video signal; a plurality of gate lines arranged so as to intersect the plurality of source lines in a plan view, for transmitting a gate signal; a plurality of pixels defined by the plurality of source lines and the plurality of gate lines which intersect each other and constituting an image display plane; a pixel electrode provided for every pixel; an opposed electrode facing the pixel electrode across a liquid crystal layer; a storage capacitor provided for every pixel for holding a voltage applied between its corresponding pixel electrode and the opposed electrode; and a pixel transistor provided for every pixel, having a source electrode, a drain electrode and a gate electrode which are connected to a corresponding one of the source lines, a corresponding one of the pixel electrodes and a corresponding one of the gate lines respectively, and being turned ON or OFF by the gate signal, wherein an index D given by $D=[Con/(Clc+Cst+Con)]\times[(Lst+Lon)/Lon]$ substantially ranges from 0.6 to 1.5, where the value of capacitance between the pixel electrode and the opposed electrode which face each other across the liquid crystal layer is Clc, the capacitance value of the storage capacitor is Cst, the capacitance value of a gate electrode to pixel electrode capacitor, which is a capacitor formed between the gate electrode and the pixel electrode, when the pixel transistor is in its continuity state is Con, the periphery length of the storage capacitor is Lst, and the periphery length of the gate electrode to pixel electrode capacitor when the pixel transistor is in its continuity state is Lon. With this arrangement, flicker reduction by use of the simple index D is possible for LCD elements having no gate electrode to pixel electrode capacitor in the non-continuity state.

The active matrix LCD element may be of a reflective type wherein the pixel electrode is composed of a reflecting film. This enables it to prolong Lst irrespective of the aperture ratio of the LCD element, thereby achieving sufficient flicker reduction.

At least either the capacitance value of the storage capacitor or the capacitance value of the gate electrode to pixel electrode capacitor may be set according to positions along the gate lines of the image display plane, and the index B may be set according to the setting. This enables it to restrict the generation of flicker due to round gate signals.

At least a portion of the periphery of at least one of electrodes which constitute the storage capacitor has an irregular rectangular shape in a plan view. This enables it to easily set Lst long.

At least a portion of the periphery of at least one of electrodes which constitute the storage capacitor has a saw teeth shape in a plan view. This also enables it to easily set Lst long.

At least one of electrodes which constitute the storage capacitor has an H-letter shape in a plan view. This also enables it to easily set Lst long. In addition, since this electrode can be partially lapped over a black matrix, an increased aperture ratio as well as an electric field shielding effect upon the source lines can be attained.

At least one of electrodes which constitute the storage capacitor has an annular shape in a plan view. This also makes it possible to easily set Lst long. In addition, since this electrode can be partially lapped over a black matrix, an increased aperture ratio as well as an electric field shielding effect upon the source lines can be attained.

At least one of electrodes which constitute the storage capacitor has a meander shape in a plan view. With this arrangement, Lst can be easily set long.

At least one of electrodes which constitute the storage capacitor has a comb shape in a plan view. With this arrangement, Lst can be easily set long.

At least one of electrodes which constitute the storage capacitor is holed in a plan view. With this arrangement, Lst can be easily set long.

The active matrix LCD element may be formed such that the pixel transistor is placed at a corner of its corresponding pixel in a plan view, that the pixel electrode occupies a large part of its corresponding pixel, with a gap between the pixel electrode and the pixel transistor, and that the periphery of the gate electrode is located inside the periphery of a channel forming semiconductor within a portion of the pixel transistor which portion extends along the pixel electrode. By virtue of this arrangement, a semiconductor film is eliminated as a film which defines the region of the periphery of the gate electrode to pixel electrode capacitor, the region extending along the pixel electrode. Additionally, where the respective films are formed on a glass substrate, an increase in the fluctuation of the feed-through voltage due to processing variations in the semiconductor film can be limited.

The active matrix LCD element may be formed such that the storage capacitor is placed between a storage capacitor forming pixel electrode and a storage capacitor forming independent electrode, the storage capacitor forming pixel electrode being connected to its corresponding pixel electrode, the storage capacitor forming independent electrode being connected to an independent capacitance line and facing the storage capacitor forming pixel electrode across an insulating layer, and that at least a portion of the periphery of the storage capacitor forming independent electrode is located inside the periphery of the storage capacitor forming pixel electrode in a plan view. With this arrangement, at least a part of the pixel electrode is eliminated as a film defining the periphery of the storage capacitor. Additionally, where the respective films are formed on a glass substrate, an increase in the fluctuation of the feed-through voltage due to processing variations in the pixel electrode can be limited.

The ratio between the length of an edge of the pattern of a film that constitutes the gate electrode and the length of an edge of the pattern of a film that constitutes the drain electrode, which edges are among edges of a pattern that constitute the periphery of the storage capacitor, may be equal to the ratio between the length of an edge of the pattern of the film that constitutes the gate electrode and the length of an edge of the pattern of the film that constitutes the drain electrode, which edges are among edges of patterns that constitute the periphery of the gate electrode to pixel electrode capacitor when the pixel transistor is in its continuity state and edges of the patterns that constitute the periphery of the gate electrode to pixel electrode capacitor when the pixel transistor is in its non-continuity state. With this arrangement, variations in the pattern dimensions which affect the feed-through voltage can be eliminated, because the edges of the patterns of the gate electrode film vary similarly and the edges of the patterns of the drain electrode film vary similarly. Consequently, the level of flicker can be restricted to a lower level.

According to the invention, there is provided an active matrix liquid crystal display comprising: a plurality of source lines for transmitting a video signal; a plurality of gate lines arranged so as to intersect the plurality of source lines in a plan view, for transmitting a gate signal; a plurality of pixels defined by the plurality of source lines and the plurality of gate lines which intersect each other and constituting an image display plane; a pixel electrode provided for every pixel; an opposed electrode facing the pixel electrode across a liquid crystal layer; a storage capacitor provided for every pixel for holding a voltage applied between its corresponding pixel electrode and the opposed electrode; and a pixel transistor provided for every pixel, having a source electrode, a drain electrode and a gate electrode which are connected to a corresponding one of the source lines, a corresponding one of the pixel electrodes and a corresponding one of the gate lines respectively, and being turned ON or OFF by the gate signal, wherein at least the voltages of the gate signal for turning the pixel transistor ON and OFF are set to values in accordance with the distribution, within the image display plane, of at least any one of the capacitance value of a liquid crystal capacitor, the capacitance value of the storage capacitor and the capacitance value of a gate electrode to pixel electrode capacitor, the liquid crystal capacitor being a capacitor formed between the pixel electrode and the opposed electrode which face each other across the liquid crystal layer and the gate electrode to pixel electrode capacitor being a capacitor formed between the gate electrode of the pixel transistor and the pixel electrode. With this arrangement, flicker can be reduced by setting a voltage value for the gate signal.

The center voltage of the source signal may be set to a value in accordance with the distribution, within the image display plane, of at least any one of the capacitance value of the liquid crystal capacitor, the capacitance value of the storage capacitor and the capacitance value of the gate electrode to pixel electrode capacitor. This reduces flicker occurring not only in the direction along the source lines but also in the direction along the gate lines.

The active matrix liquid crystal display element may be formed such that at least the voltage values of the gate signal for turning the pixel transistor ON and OFF are set according to $[(\text{Con}+\tau\text{Cof})/(\text{Clc}+\text{Cst}+\text{Cof})]\times\alpha$, where the capacitance value of the liquid crystal capacitor is Clc; the capacitance value of the storage capacitor is Cst; the capacitance value of the gate electrode to pixel electrode capacitor when the pixel transistor is in its non-continuity state is Cof; the capacitance value of the gate electrode to pixel electrode capacitor when the pixel transistor is in its continuity state is Con; the voltage value of the gate signal for turning the pixel transistor ON is Vgh; the voltage value of the gate signal for turning the pixel transistor OFF is Vgl; the threshold voltage value of the pixel transistor is Vt; the center voltage value of the source signal is Vsc; $\alpha$=Vgh−(Vsc+Vt); $\beta$=(Vsc+Vt)−Vgl; and $\tau=\beta/\alpha$. This enables adequate flicker reduction.

The voltage values of the gate signal for turning the pixel transistor ON and OFF may be set according to $[\text{Cof}/(\text{Clc}+\text{Cst}+\text{Cof})]\times(\text{Vgh}-\text{Vgl})$. This enables it to set a voltage value for a set gate signal, irrespective of the threshold voltage Vt of the pixel transistor, so that flicker reduction can be more readily done.

These objects as well as other objects, features and advantages of the invention will become apparent to those skilled in the art from the following description with reference to the accompanying drawings.

BRIEF DESCRIPTION OF THE DRAWINGS

FIGS. 1a and 1b show a structure of an active matrix LCD element according to the invention, wherein FIGS. 1a and 1ba is a sectional view which diagrammatically, schematically illustrates a whole structure of the active matrix LCD element, whereas FIG. 1b is a circuit diagram showing an equivalent circuit for a pixel.

FIGS. 6a, 6b and 6c show tables of the maximum values, optimum values and minimum values of major parameters relative to the DC offset, wherein FIG. 6a is a table for the case where Cst/Clc is 0.5, FIG. 6b is a table for the case where Cst/Clc is 1.0 (normal value), and FIG. 6c is a table for the case where Cst/Clc is 1.5.

FIGS. 7a and 7b show tables of parameters used for calculating the parameters shown in FIGS. 6a, 6b and 6c, wherein FIG. 7a is a table which mainly shows assumptive values for design parameters whereas FIG. 7b is a table which mainly shows parameters obtained in the course of calculations.

FIGS. 14a and 14b show plan views of structures of pixels in an active matrix LCD element according to a fourth embodiment of the invention, wherein FIG. 14a shows a structure of a pixel near by a terminal end of a gate signal, whereas FIG. 14b shows a structure of a pixel near by a supply end of a gate signal.

FIGS. 21a and 21b show a structure of a pixel transistor in an active matrix LCD element according to a six embodiment of the invention, wherein FIG. 21a is a plan view whereas FIG. 21b is a sectional view taken along line XXIb—XXIb of FIG. 21a.

FIGS. 22a and 22b show a structure of a storage capacitor in the active matrix LCD element according to the six embodiment of the invention, wherein FIG. 22a is a plan view whereas FIG. 22b is a sectional view taken along line XXIIb—XXIIb of FIG. 22a.

FIGS. 23a and 23b show a structure of a conventional pixel transistor, wherein FIG. 23a is a plan view whereas FIG. 23b is a sectional view taken along line XXIIIb—XXIIIb of FIG. 23a.

FIGS. 24a and 24b show a structure of a conventional storage capacitor, wherein FIG. 24a is a plan view whereas FIG. 24b is a sectional view taken along line XXIVb—XXIVb of FIG. 24a.

DESCRIPTION OF THE PREFERRED EMBODIMENTS

Referring now to the accompanying drawings, preferred embodiments of the invention will be hereinafter described.

Figure 1A:
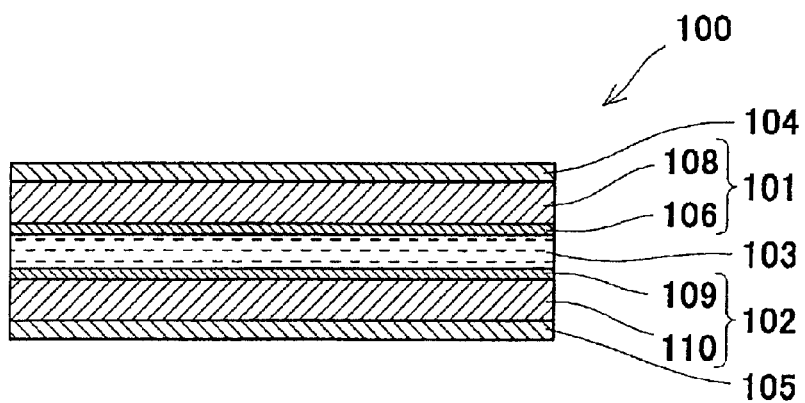
Figure 1B:
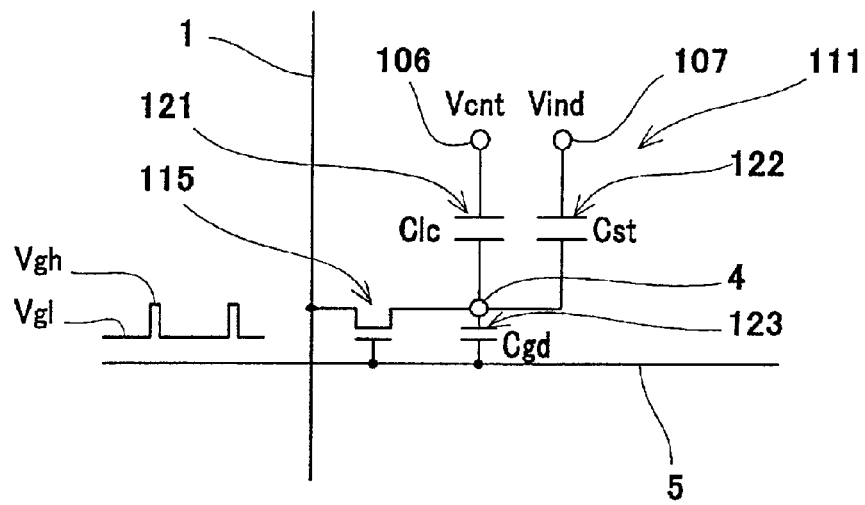
Figure 2:
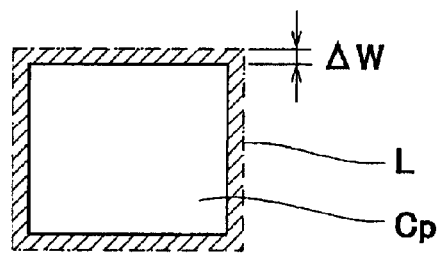
FIG. 2 diagrammatically illustrates the relationship between the amount of deviation of the capacitance value of a capacitor from its design value and the amount of deviation of a pattern for the capacitor from its design value.

First of all, there will be explained the principle of a solution for the problem according to the invention. FIGS. 1a and 1b show a structure of an active matrix LCD element according to the invention. FIG. 1a diagrammatically, schematically illustrates a section of a whole structure of the active matrix LCD element, whereas FIG. 1b is a circuit diagram showing an equivalent circuit for a pixel. FIG. 2 diagrammatically illustrates the relationship between the amount of deviation of the capacitance value of a capacitor from its design value and the amount of deviation of a pattern for the capacitor from its design value.

As shown in FIG. 1a, an active matrix LCD element 100 according to the invention has a liquid crystal layer 103 held between an opposed substrate 101 and an array substrate 102 which face each other. Placed outside the opposed substrate 101 and the array substrate 102 are polarizing plates 104, 105 respectively. The opposed substrate 101 comprises a layer including an opposed electrode 106 that is positioned on the inner surface of a glass substrate 108. The array substrate 102 comprises an array layer 109 positioned on the inner surface of a glass substrate 110. Although not shown in FIG. 1a, the array layer 109 has pixel regions which are defined in matrix form in a plan view by a plurality of source lines and a plurality of gate lines, the source and gate lines crossing each other at right angles. Formed in each pixel region are a pixel electrode, an independent capacitor electrode and a pixel transistor. The pixel transistor is composed of a TFT (Thin Film Transistor).

With the structure described above, an equivalent circuit for a pixel of the active matrix LCD element 100 is constructed as shown in FIG. 1b. With reference to FIG. 1b, in each pixel 111, there is provided a pixel transistor 115 that is located in the vicinity of the intersection of a source line 1 and a gate line 5, and the source electrode, drain electrode and gate electrode of the pixel transistor 115 are connected to the source line 1, the pixel electrode 4 and the gate line 5, respectively. A liquid crystal capacitor 121 is formed between the pixel electrode 4 and the opposed electrode 106, with the liquid crystal layer 103 interposed. A storage capacitor 122 is formed between the pixel electrode and an independent capacitor electrode 107. Formed between the gate electrode (and therefore the gate line 5) and drain electrode (and therefore the pixel electrode 4) of the pixel transistor 115 is a gate electrode to pixel electrode capacitor 123 that is a parasitic capacitor.

In the active matrix LCD element 100 thus formed, each source line 1, each gate line 5, the opposed electrode 106 and each independent capacitor electrode 107 are connected to a source driver, a gate driver, an opposed electrode driver and an independent capacitor electrode driver, respectively. The source line 1 is supplied with a source signal that is a video signal sent from the source driver, while the gate line 5 is supplied with a gate signal for ON/OFF control of its corresponding pixel transistor 115. As shown in FIG. 1b, the gate signal is a rectangular pulse waveform signal which takes two values, namely, a gate ON voltage Vgh for turning the pixel transistor 115 ON and a gate OFF voltage Vgl for turning the pixel transistor 115 OFF. The opposed electrode 106 and the independent capacitor electrode 107 are maintained at specified potentials by the opposed electrode driver and the independent capacitor electrode driver, respectively. A source signal is released from the source driver to the source line 1, and in this timing, the pixel transistor 115 of each pixel 111 is turned ON or OFF in response to a gate signal, so that source signals are successively written in the respective pixels 111 to maintain the potentials of the pixels. When the pixel transistor 115 is turned OFF, the gate signal falls from the gate ON voltage Vgh to the gate OFF voltage Vgl and then, the potential of the pixel electrode 4 decreases according to the voltage fluctuation of the gate signal owing to the capacitive coupling of the gate electrode to pixel electrode capacitor 123. This is the feed-through voltage. If the rectangular pulse waveform of the gate signal is rounded, the pixel electrode 4 is charged through the source line 1 and the feed-through voltage is offset by the charge in the period during which the gate signal completely falls from the gate ON voltage Vgh to the gate OFF voltage Vgl, so that the drop in the potential due to the feed-through voltage of the pixel electrode 4 is small, compared to the case where the gate signal is not round. This is the recharging phenomenon. The feed-through voltage and the recharging phenomenon cause flicker. This flicker is conspicuous in intermediate gray scale. Image flicker reduction is the theme of the invention.

According to the active matrix LCD element of the invention, in order to reduce flicker to such an extent that flicker does not become problematic in terms of picture quality, design methods and pattern configurations etc. for the storage capacitors 122 and the gate electrode to pixel electrode capacitors 123 are devised such that the feed-through voltage becomes constant within the screen even if the pattern dimensions of the gate electrodes and the pixel electrodes, which constitute the storage capacitors 122 and the gate electrode to pixel electrode capacitors 123, vary within the screen.

More specifically, the feed-through voltage is maintained at a constant value by setting an optimum value for the ratio between the peripheral length of the pattern of the storage capacitor 122 to the peripheral length of the pattern of the gate electrode to pixel electrode capacitor 123, in accordance with the ratio between the area of the pattern of the storage capacitor 122 and the area of the pattern of the gate electrode to pixel electrode capacitor 123.

How to set these ratios will be described below.

Where the capacitance value of the liquid crystal capacitor 121 for each pixel is Clc, the capacitance value of the storage capacitor 122 for each pixel is Cst, the capacitance value of the gate electrode to pixel electrode capacitor 123 for each pixel is Cgd, the feed-through voltage for each pixel is Vts, the gate ON voltage is Vgh and the gate OFF voltage is Vgl, the feed-through voltage Vts is generally given by:

$$Vts = [Cgd/(Clc+Cst+Cgd)] \times (Vgh-Vgl) \qquad (1)$$

Herein, Z1 and Z2 are constants, $Cgd/(Clc+Cst+Cgd)=Z1$ and $\Delta Cgd/(\Delta Cst+\Delta Cgd)=Z2$. It should be noted a deviation of the capacitance value of the storage capacitor 122 from its design value and a deviation of the capacitance value of the gate electrode to pixel electrode capacitor 123 from its design value are represented by $\Delta Cst$ and $\Delta Cgd$, respectively (these deviations are attributable to variations in the pattern dimensions of the gate electrode, pixel electrode and others).

A condition for maintaining the value of the feed-through voltage Vts to be constant within the screen is to satisfy the following equation.

$$(Cgd+\Delta Cgd)/(Clc+Cst+Cgd+\Delta Cst+\Delta Cgd)=Z3$$

In this equation, Z3 is a constant.

The relationship between Z1 and Z2 described by Z1=Z2 is derived and it is therefore understood that $\Delta Cst$ and $\Delta Cgd$ may have the relationship described by $\Delta Cst=[(1-Z1)/Z1] \times \Delta Cgd$.

$\Delta Cst$ and $\Delta Cgd$ are represented by $\Delta Cst = Lst \times \Delta Wst$ and $\Delta Cgd = Lgd \times \Delta Wgd$ respectively, where the peripheral lengths of the patterns of the storage capacitor 122 and the gate electrode to pixel electrode capacitor 123 are denoted by Lst and Lgd, respectively and where the deviations of the dimensions of the patterns for these capacitors from their respective design values are denoted by $\Delta Wst$ and $\Delta Wgd$, respectively.

Specifically, it is understood from FIG. 2 that, in the substrate of an ordinary type LCD element, the deviation ΔC of a capacitor Cp having a capacitance value C from its design value is equal to the product of the length L of the periphery of the pattern of the capacitor Cp and the deviation ΔW of the dimension of the pattern from its design value. The inventors have made the invention, giving attention to this point.

Based on the examination of the storage capacitor 122 and the gate electrode to pixel electrode capacitor 123, ΔWst is thought to be substantially equal to ΔWgd, because these capacitors 122, 123 are close to each other within the same pixel 111 and the deviations of their pattern dimensions within a small range are generally negligible. Thus, the relationship between ΔCst and ΔCgd in the equation described by ΔCst=[(1−Z1)/Z1]×ΔCgd is such that ΔCst and ΔCgd may be replaced by Lst and Lgd, respectively. Accordingly, the patterns may be so designed as to satisfy Lst=2K×Lgd where Cst/Cgd=K, in order to maintain the feed-through voltage Vts at a constant value.

Since the influence of recharging due to the waveform of a gate signal which becomes significantly round as it comes close to the gate signal terminal end is at a negligible level in small-sized panels and the like, the ratio between Cst and Cgd in this case can be set to a certain value within the screen. Accordingly, the ratio between Lst and Lgd may be set to a certain value, which satisfies Lst=2K×Lgd, within the screen in accordance with the setting of the ratio between Cst and Cgd. One example of the active matrix LCD element of the invention having such an arrangement will be described later in a first embodiment.

In cases where the influence of recharging is not negligible such as when the active matrix LCD element is applied to a large-sized panel, K is set, depending on positions along the gate lines in the image display section, to such a value that a feed-through voltage equivalent to a raise in potential caused by a recharging current flowing in the associated position (hereinafter referred to as "recharging voltage") is generated. Setting of K is done such that the ratio between Lst and Lgd satisfies Lst=2K×Lgd. By setting in this manner, the recharging voltage can be compensated for according to the feed-through voltage which varies depending on positions within the image display section so that the influence of recharging can be eliminated. One example of the active matrix LCD element of the invention having such an arrangement will be described later in a fourth embodiment.

The relationship represented by Lst=2K×Lgd is based on Equation (1), that is, Vts=[Cgd/(Clc+Cst+Cgd)]×(Vgh−Vgl) in which the value of the capacitance of the gate electrode to pixel electrode capacitor 123 when the pixel transistor 115 is in its continuity state is not distinguished from that when the pixel transistor 115 is in its non-continuity state. However, for seeking more accuracy, it is necessary to employ two kinds of values Cof and Con for the gate electrode to pixel electrode capacitors 123, the value Cof being for the non-continuity state of the pixel transistor 115 while the value Con is for the continuity state of the same. The feed-through voltage is originally evolved from the principle of conservation of charge when the pixel transistor 115 transits from its continuity state to its non-continuity state and is therefore dependent of these two values. The feed-through voltage obtained in consideration of this fact is dependent of the level of a source signal and therefor varies depending on whether it has occurred in an odd numbered frame or even numbered frame. Flicker is practically affected by the average value of the feed-through voltage occurring in the odd frames and in the even frames and, therefore, the feed-through voltage is independent of the variation of the amplitude voltage of a source signal but dependent of only the center voltage of a source signal. The average value of the feed-through voltage Vts is given by the following equation.

$$Vts=\{[Vgh-(Vsc+Vt)]\times Con+[(Vsc+Vt)-Vgl]\times Cof\}/(Clc+Cst+Cof) \quad (2)$$

Note that Vsc is the center voltage value of the source signal and Vt is the threshold voltage at which the pixel transistor 115 is switched from Cof to Con. Where α and β are constants, α=[Vgh−(Vsc+Vt)] and β=(Vsc+Vt)−Vgl, α is substantially equal to β in normal cases. Therefore, the average feed-through voltage Vts can be approximated by:

$$Vts=[(Con+Cof)/(Clc+Cst+Cof)]\times\alpha \quad (3)$$

By thus distinctively considering the values Con and Cof of the pixel transistor 115, the optimum value for the ratio of Lst to Lgd can be derived with higher accuracy. One example of the active matrix LCD element of the invention having such an arrangement will be described later in a seventh embodiment.

In this case, it is necessary to consider the dimensional deviation of which film material pattern affects the capacitance value Cst of the storage capacitor and the capacitance values Cof and Con of the pixel transistor 115. Cst is affected by at most three kinds of films, that is, the film (hereinafter referred to as "gate electrode film") constituting the gate electrode of the pixel transistor 115, the film (hereinafter referred to as "drain electrode film") constituting the drain electrode, and the film (hereinafter referred to as "pixel electrode film") constituting the pixel electrode 4. Cof is affected by at most two kinds of films, that is, the gate electrode film and the drain electrode film, whereas Con is affected by at most two kinds of films, that is, the gate electrode film and the film (hereinafter referred to as "semiconductor film") constituting the semiconductor of the pixel transistor 115. Since the dimensions of the patterns possibly deviate in different manners depending on their types, it is desirable to limit the kinds of films for constituting the edge of a pattern as much as possible. For example, in the case of Con, while the edge is normally formed by the gate electrode film and the semiconductor film, it is possible to constitute the edge by the gate electrode film alone. In the case of Cst, while the edge is normally formed by the gate electrode film, the drain electrode film and the pixel electrode film, it may be formed by only the gate electrode film and the drain electrode film. This arrangement further encourages flicker restriction to a low level. In the above example, while the edge for Con can be formed by only the gate electrode film, the edges for Cof and Cst are respectively formed by the gate electrode film and the drain electrode film and it is substantially impossible to form the edges for Cof and Cst with either one of the films alone. The gate electrode film and the drain electrode film are often formed from the same kind of metallic material, but in some cases they have different film thicknesses and are formed from different materials. In such cases, dimensional deviations would occur in different manners in these films. Therefore, the ratio between the length of an edge of the gate electrode film and the length of an edge of the drain electrode film, these edges being among the periphery of the pattern which determine Cst, is made to be equal to the ratio between the length of an edge of the gate electrode film and the length of an edge of the drain electrode film, these edges being among the sum of the peripheries of the patterns which determine Con and Cof respectively, whereby the edges of the gate electrode film vary similarly and the edges of the drain electrode film vary similarly so that the influence of variations in the pattern dimensions is eliminated. With this arrangement, the level of flicker can be further restricted. One example of the active matrix LCD element of the invention having such an arrangement will be described later in a six embodiment.

The ratio between Lgd and Lst may be set in the manner described earlier, but, in reality, the ratio of Lst to Lgd is usually from 3:1 to 4:1, and about 6:1 in maximum while the ratio required is within the range from 11:1 to 37:1 (described later). As a result, the fluctuation of the feed-through voltage cannot be satisfactorily controlled in known configurations. It is conceivable to reduce Lgd to render the ratio of Lst to Lgd higher, but, this limits the degree of freedom because the pattern which forms the gate electrode to pixel electrode capacitor 123 per se has been already formed as small as possible. It is therefore necessary to make a configuration that allows Lst to be great. It however should be noted that the area of the storage capacitor is determined relative to the liquid crystal capacitance and therefore only the periphery of the storage capacitor must be increased. Concretely, the pattern of the periphery may be made in irregular or zigzag form, or may be holed. Alternatively, an H-letter shape, annular shape, meander pattern, or elongated comb-like pattern may be employed. With this arrangement, a configuration having a long periphery is obtained while preventing a drop in the aperture ratio as much as possible, whereby the necessary Lst/Lgd ratio can be ensured. One example of the active matrix LCD element of the invention having such an arrangement will be described later in a fifth embodiment.

There, however, are some cases in which Lst cannot be increased to such an extent that the fluctuation of the feed-through voltage can be substantially eliminated, because there is a restriction on the aperture ratio in the case of transmissive type LCD elements. Even in such cases, satisfactory effects can be expected by increasing the Lst/Lgd ratio to the level at which the fluctuation of the feed-through voltage in the screen falls within an allowable range. In this case, the index indicating how much the fluctuation of the feed-through voltage can be restricted is defined by D0 which is given by the following equation.

$$D0=[(Con+\tau \cdot Cof)/(Clc+Cst+Cof)]\times(Lst/Lof) \quad (4)$$

The range of D0, which allows the feed-through voltage to fall within an allowable range, is then determined and the Lst/Lgd ratio (and, therefore, Lst/Lof) is set so as to meet the above range of D0. Herein, $\tau=\beta/\alpha$. Lof denotes the peripheral length of the pattern which forms the gate electrode to pixel electrode capacitor when the pixel transistor 115 is in its non-continuity state. When setting the range of D0, variations in the dimension of the patterns in the plane should be taken into account.

While Equation (4) involves troublesome calculations because both Con and Cof have to be set, it may be simplified into the following equation by approximation without use of Con:

$$D=[Cof/(Clc+Cst+Cof)]\times[(Lst+Lof)/Lof] \quad (5)$$

An index D is thus defined. By use of D, Lst/Lgd may be set (Lst/Lof may be set herein). In this way, Cof and Lof can be determined by only pattern configuration, resulting in easy setting. If Clc, Cst and Cof are constants, how much the fluctuation of the feed-through voltage can be restricted can be indicated by a simple index B which is given by:

$$Lst/Lof=B \quad (6)$$

This will be concretely described in the first embodiment.

In addition, Equation (4) may be simplified by approximation without use of Cof to define the index D. In this case, the index D is described by the following equation (7).

$$D=[Con/(Clc+Cst+Con)]\times[(Lst+Lon)/Lon] \quad (7)$$

Lst/Lgd may be set (Lst/Lon may be set herein) by use of D. With this calculation, Lst/Lgd can be set with the simplified index even where the pixel transistor 115 is of the top gate type in which Cof and Lof do not substantially exist. Herein, Lon is the peripheral length of the pattern which forms the gate electrode to pixel electrode capacitor when the pixel transistor 115 is in its continuity state. If Clc, Cst and Con are constants, how much the fluctuation of the feed-through voltage can be restricted can be indicated by a simple index B which is given by:

$$Lst/Lon=B \quad (8)$$

This will be concretely described in a second embodiment.

In the case of reflective type LCD elements and semi-transmissive type LCD elements, since there is substantially no restriction on the aperture ratio, the length of Lst can be ensured to the extent that the fluctuation of the feed-through voltage can be substantially eliminated. One example of the active matrix LCD element of the invention having such an arrangement will be described later in a third embodiment.

Now, the embodiments will be described in order.

First Embodiment

Figure 3:
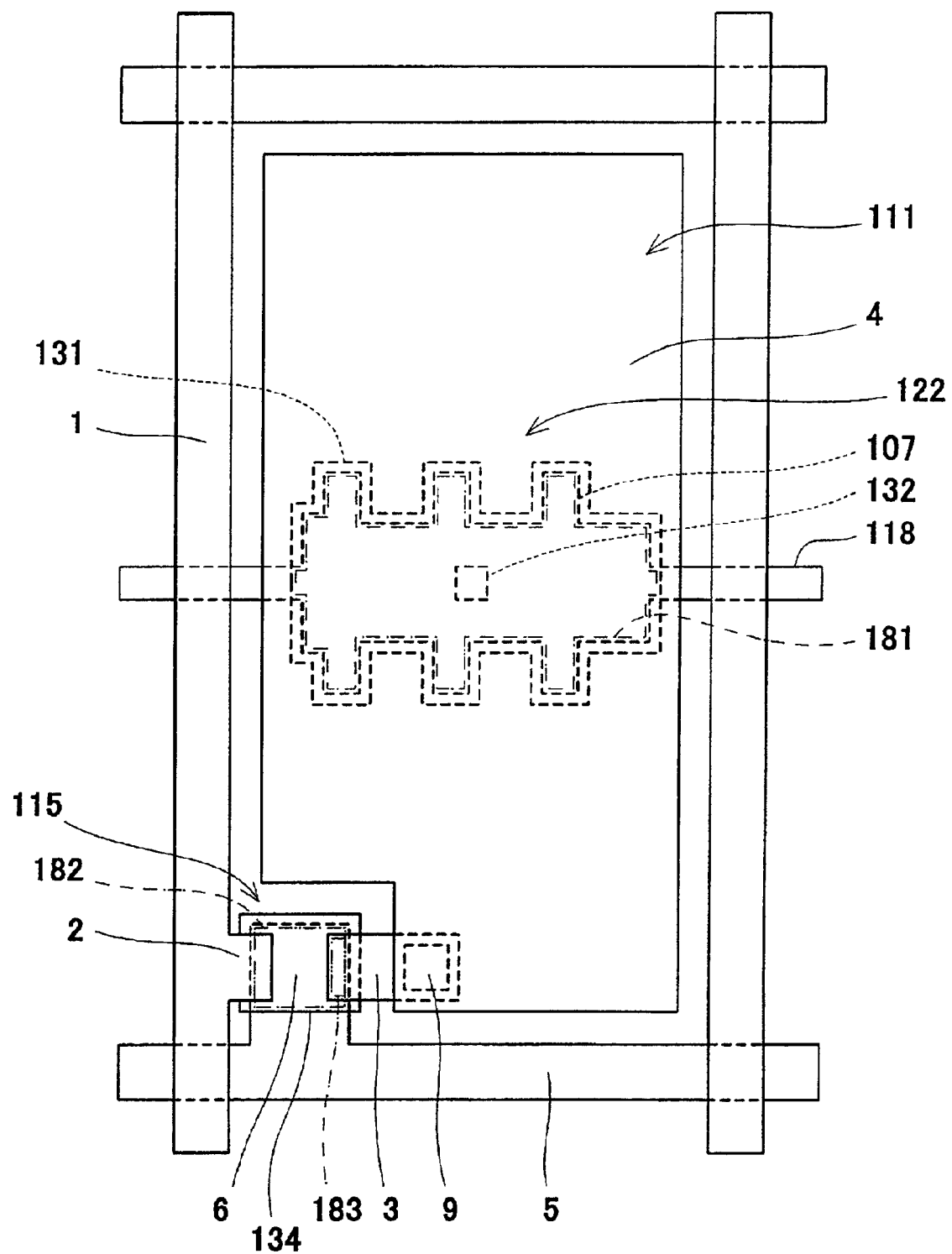
FIG. 3 is a plan view illustrating a structure of a pixel in an array substrate of an active matrix LCD element according to a first embodiment.

FIG. 3 is a plan view illustrating a structure of a pixel in the array substrate of an active matrix LCD element according to the first embodiment.

The whole structure of the active matrix LCD element of the first embodiment is as shown in FIG. 1a and 1b and has a relatively small size (the diagonal length of the screen is less than 15 inches). Referring to FIGS. 1 to 3, the array substrate has, for every pixel 111, the pixel electrode 4 consisting of a transparent electrode and the pixel transistor 115 that is provided in the vicinity of the intersection of a source line 1 and a gate line 5. In the present embodiment, the pixel transistor 115 is of the bottom gate type. In the pixel transistor 115, a semiconductor 134 is formed so as to be laid, through an insulating film (not shown), over a gate electrode 6 which projects from the gate line 5 in a plan view. There are formed a source electrode 2 and a drain electrode 3, one end of the source electrode 2 being connected to one of the opposed ends of the semiconductor 134 while one end of the drain electrode 3 is connected to the other end of the semiconductor 134. The other end of the source electrode 2 is connected to the source line 1. The other end of the drain electrode 3 is located under the pixel electrode 4 through an insulating layer (not shown) and connected to the pixel electrode 4 via a contact hole 9. The gate electrode to pixel electrode capacitor 123 is mainly constituted by the overlapped portion where the gate electrode 6 and the semiconductor 134 and/or the drain electrode 3 are overlapped in pixel transistor 115 in a plan view. Reference numeral 182 designates the periphery of the gate electrode to pixel electrode capacitor 123 when the pixel transistor 115 is in its continuity state and the length of the periphery is designated by Lon. Reference numeral 183 designates the periphery of the gate electrode to pixel electrode capacitor 123 when the pixel transistor 115 is in its non-continuity state and the length of the periphery is designated by Lof. The concept of Lgd includes both lengths Lon and Lof. An independent capacitance line 118 is formed in parallel with the gate line 5 and the storage capacitor forming independent electrode 107 is formed, as an independent capacitor electrode, on a portion of the independent capacitance line 118, the portion being located within the pixel 111. A storage capacitor forming pixel electrode 131 is laid over the storage capacitor forming independent electrode 107 through an insulating layer (not shown) and connected to the pixel electrode 4 through a contact hole 132. Formed between the storage capacitor forming independent electrode 107 and the storage capacitor forming pixel electrode 131 is the storage capacitor 122. Reference numeral 181 designates the periphery of the storage capacitor 122 and the length of the periphery is designated by Lst.

Next, there will be described the ratio between the periphery Lgd of the pattern for the gate electrode to pixel electrode capacitor 123 and the periphery length Lst of the pattern for the storage capacitor 122, which is one of the features of the present embodiment.

Figure 4:
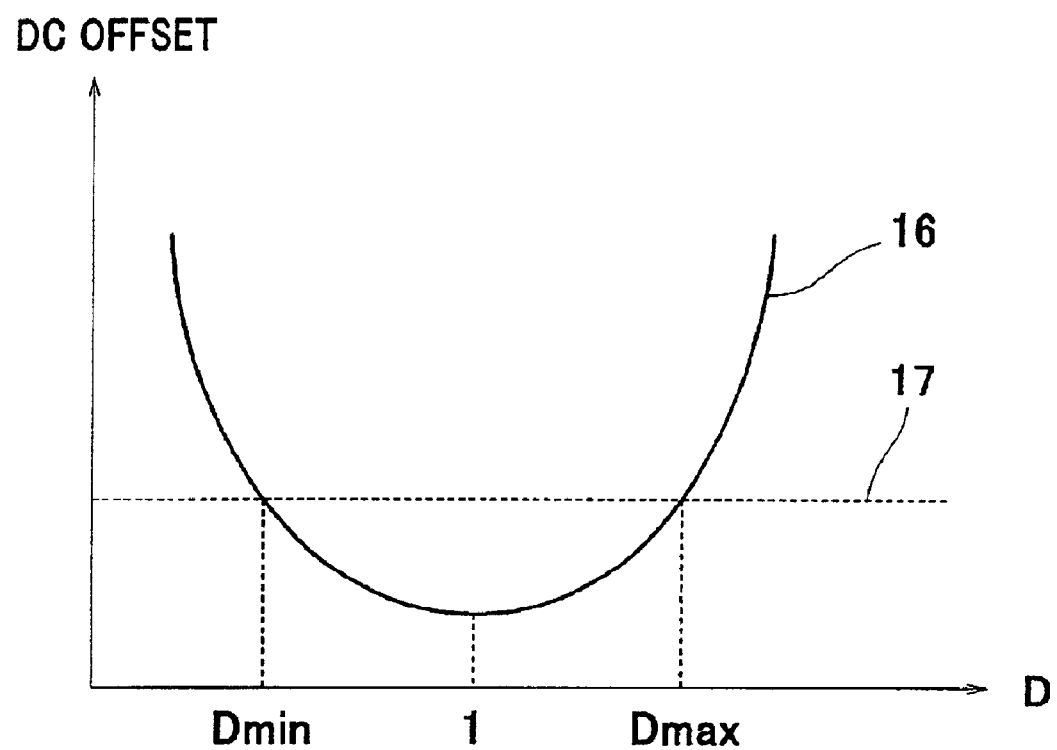
FIG. 4 is a plot of an index D verses a DC offset.
Figure 5:
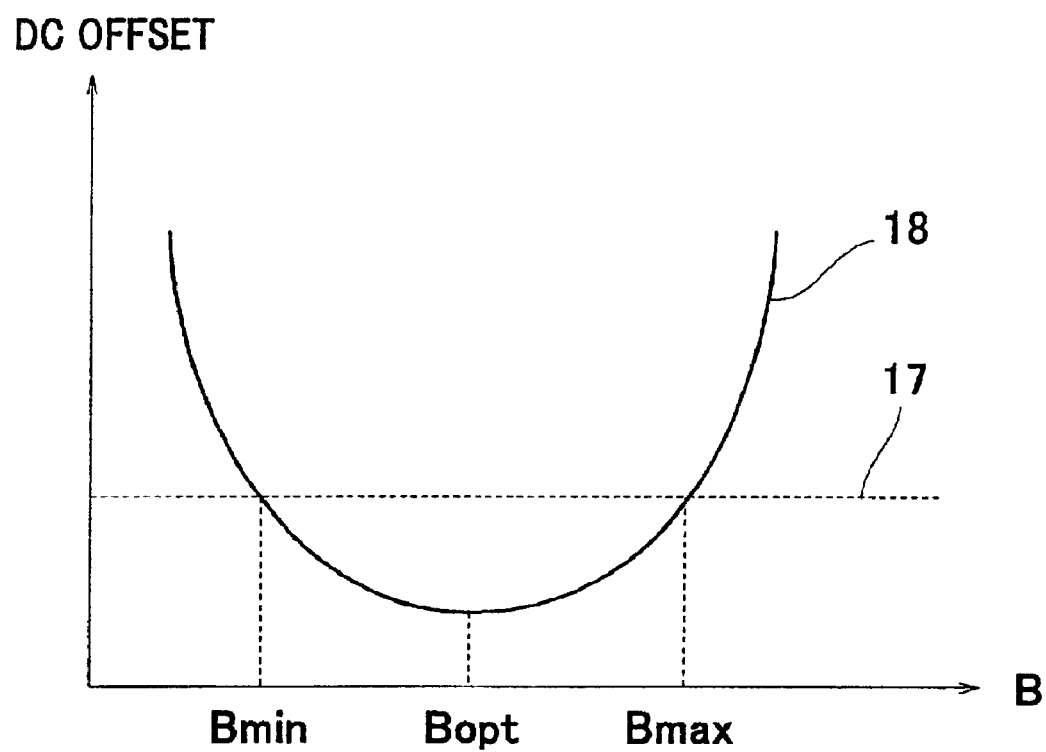
FIG. 5 is a plot of an index B verses the DC offset.
Figure 8:
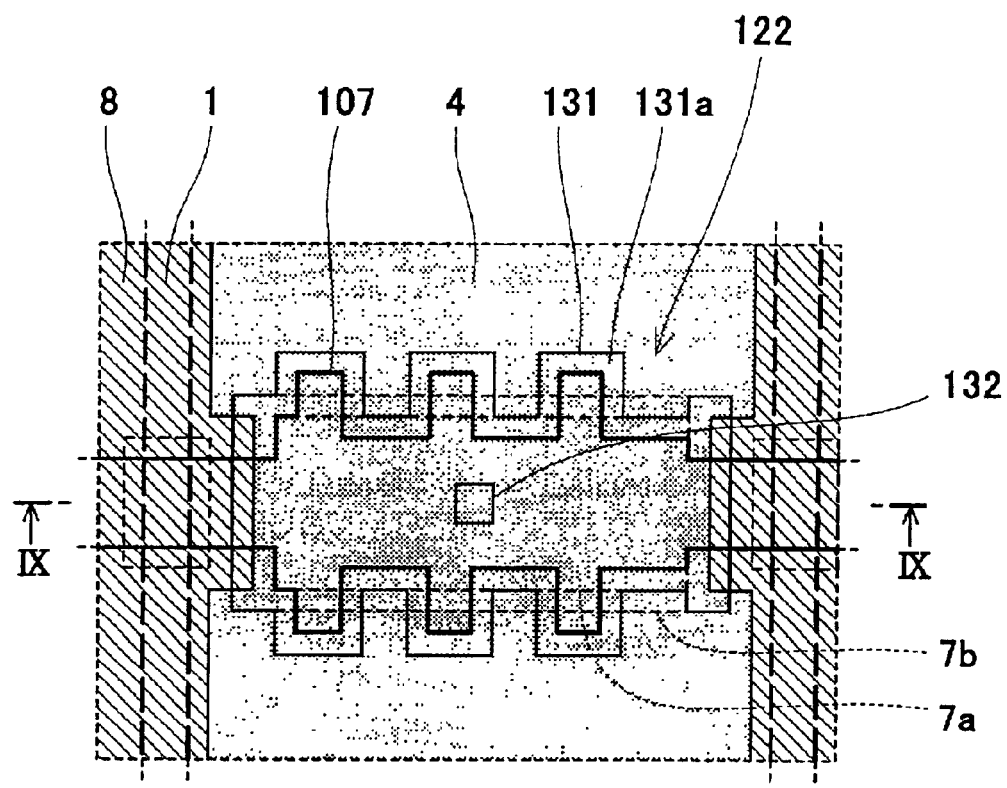
FIG. 8 is a plan view showing a structure of a storage capacitor when the optimum values for flicker restriction shown in the table of FIG. 6b are used.
Figure 9:
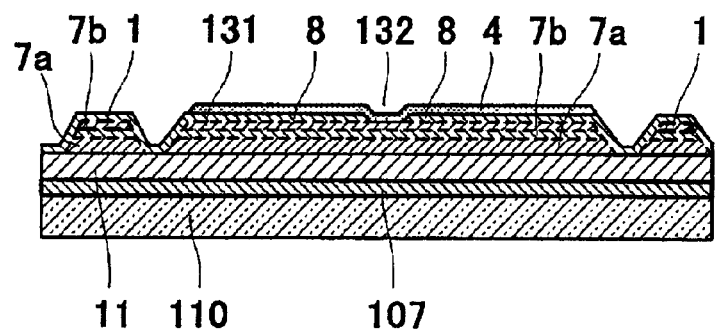
FIG. 9 is a sectional view taken along line IX—IX of FIG. 8.
Figure 10:
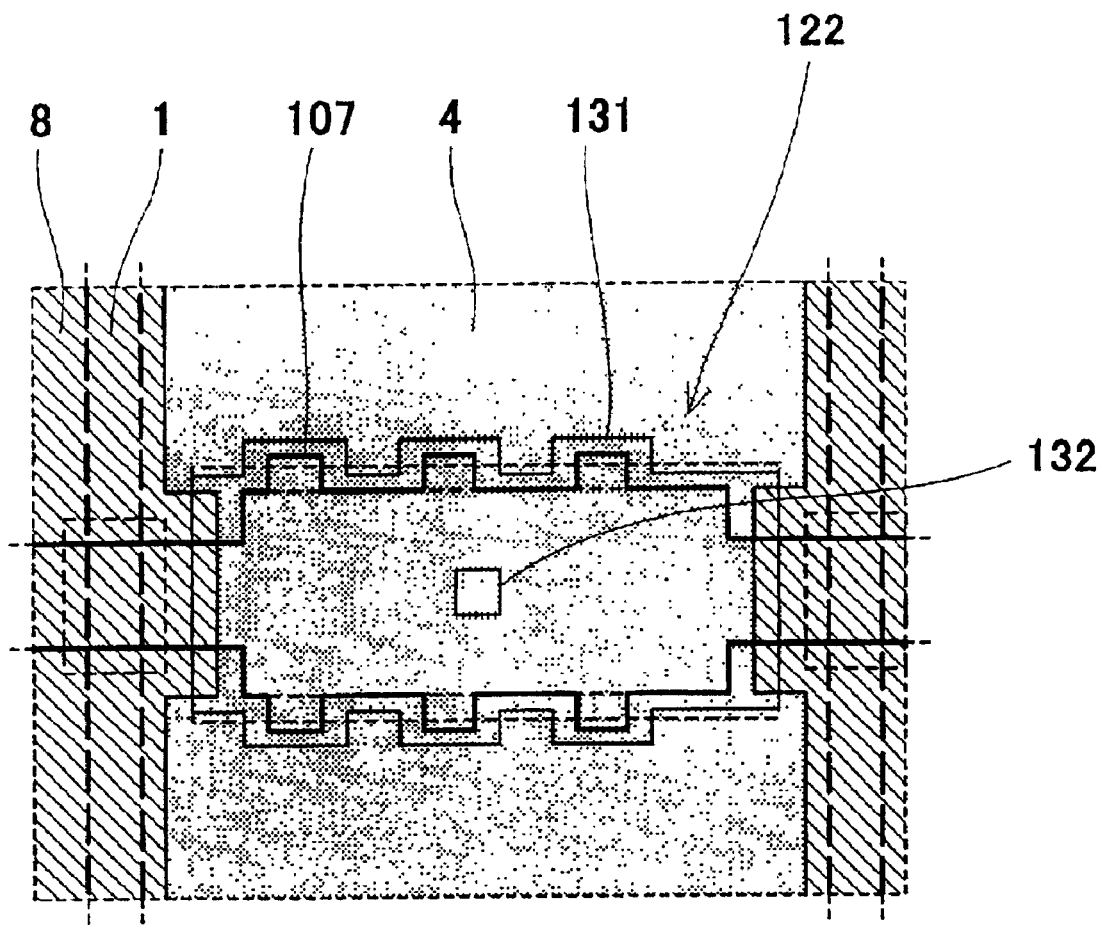
FIG. 10 is a plan view showing a structure of the storage capacitor when the minimum values for flicker restriction shown in the table of FIG. 6b are used.
Figure 11:
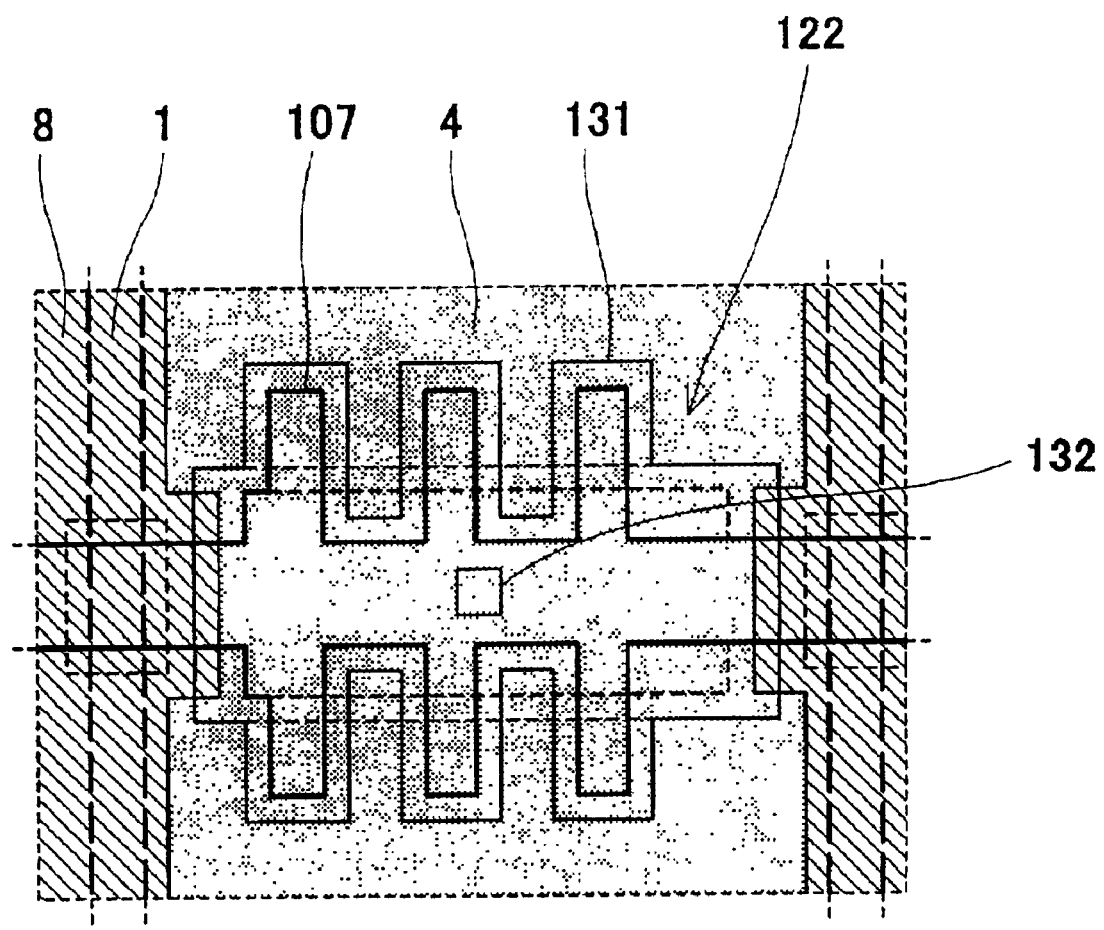
FIG. 11 is a plan view showing a structure of the storage capacitor when the maximum values for flicker restriction shown in the table of FIG. 6b are used.
Figure 12:
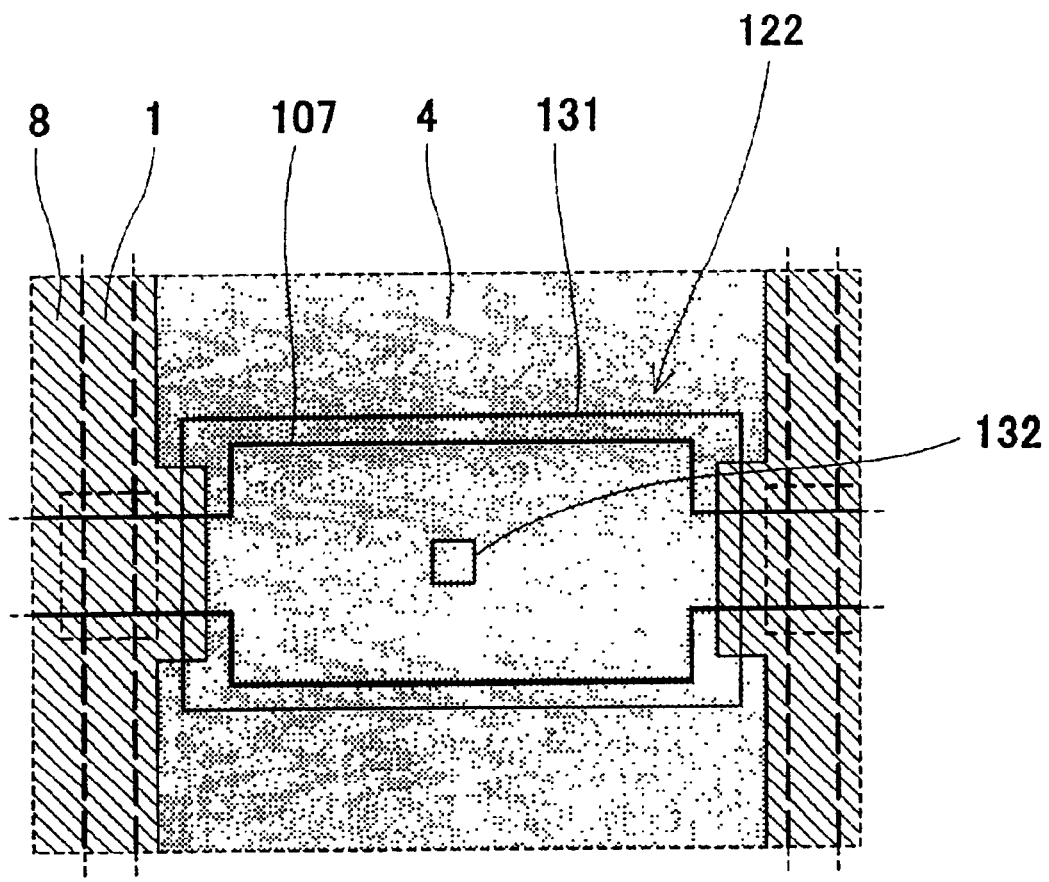
FIG. 12 is a plan view of a structure of a known storage capacitor.

FIG. 4 shows a plot of the index D given by Equation (5) verses a DC offset. FIG. 5 shows a plot of the index B given by Equation (6) verses the DC offset. FIGS. 6a, 6b and 6c show tables of the maximum values, optimum values and minimum values of major parameters relative to the DC offset, FIG. 6a being a table for the case where Cst/Clc is 0.5, FIG. 6b being a table for the case where Cst/Clc is 1.0 (normal value), and FIG. 6c being a table for the case where Cst/Clc is 1.5. FIGS. 7a and 7b show tables of parameters used for calculation of the parameters shown in FIGS. 6a, 6b and 6c, FIG. 7a being a table which mainly shows assumptive values for design parameters while FIG. 7b is a table which mainly shows parameters obtained in the course of calculations. FIG. 8 is a plan view showing a structure of the storage capacitor when the optimum values for flicker restriction shown in the table of FIG. 6b are used. FIG. 9 is a sectional view taken along line IX—IX of FIG. 8. FIG. 10 is a plan view showing a structure of the storage capacitor when the minimum values for flicker restriction shown in the table of FIG. 6b are used. FIG. 11 is a plan view showing a structure of the storage capacitor when the maximum values for flicker restriction shown in the table of FIG. 6b are used. FIG. 12 is a plan view of the structure of a known storage capacitor.

In the first embodiment, for applying the index D given by Equation (5) and the index B given by Equation (6) to an actual active matrix LCD element, the relationships between the index D and the DC offset and between the index B and the DC offset were calculated, taking the design of the active matrix LCD element into account. Specifically, these relationships were obtained with Lst being varied in three cases, that is, where Cst/Clc was 0.5, where Cst/Clc was 1 (normal value), and where Cst/Clc was 1.5. The relationships between the index D and the DC offset and between the index B and the DC offset where Cst/Clc is 1.0 (this is a standard design) are plotted in the graphs of FIGS. 4 and 5, respectively. The maximum, optimum and minimum values for main parameters relative to the DC offset in flicker restriction are shown in FIGS. 6a, 6b and 6c. Assumptive values for the parameters used in these calculations are shown in FIGS. 7a and 7b.

A DC offset verses index D curve 16 is attained from the results of the calculations, which curve is a function having the minimum value when D is 1 and bulges out downwardly when plotted in a graph with the DC offset entered in ordinate and the index D entered in abscissa as shown in FIG. 4. The DC offset is the direct cause of flicker and represents differences in variations in the feed-through voltage within the screen. A DC offset tolerance line 17 is the line which indicates the limit of the DC offset at which flicker is detected. Where the intersections of the DC offset tolerance line 17 and the DC offset verses index D curve 16 are represented by Dmin and Dmax, flicker is not detected if D is within the range that meets Dmin<D<Dmax.

In a graph with the DC offset entered in ordinate and the index B entered in abscissa as shown in FIG. 5, a DC offset verses index B curve 18 is a function having the minimum value when B is Bopt and bulges out downwardly. Where the intersections of the DC offset tolerance line 17 and the DC offset verses index B curve 18 are Bmin and Bmax, flicker is not detected if B is within the range that satisfies Bmin<B<Bmax.

In the above calculations, the limit of the DC offset at which no flicker is usually detected is said to be about 100 mV (0.1 V) and therefore, the DC offset tolerance is set to 100 mV and the maximum amount of deviation ΔW of the edge lengths of the patterns within the screen, which patterns form the storage capacitor 122 and the gate electrode to pixel electrode capacitor 123, is set to 0.5 $\mu$m in view of the controllabilities of large-sized photolithography apparatus and processing systems for, for instance, dry etching and wet etching. Other major design parameters are set as follows: Clc=0.1 pF; Cof=0.01 pF, Lof=25 $\mu$m; Sof=36 $\mu$m$^2$; and ΔSof=12.5 $\mu$m$^2$. As a result, Dmin and Dmax in the case where Cst/Clc is 1.0, are 0.70 and 1.36 respectively, as shown in FIGS. 6a, 6b and 6c. Bmin, Bopt and Bmax are 13.7, 20.0 and 27.5 respectively, in the case where Cst/Clc is 1.0. Where the indexes D and B take their minimum values (Dmin, Dmin), Lst is 342 $\mu$m; where the indexes D and B take their optimum values (1, Bopt), Lst is 500 $\mu$m; and where the indexes D and B take their the maximum values (Dmax, Bmax), Lst is 687 $\mu$m. In the case of the prior art (i.e., the comparative example), Lst is 150 $\mu$m, the index D is 0.33 and the index B is 6.0. Accordingly, in the first embodiment, the ratio of the storage capacitance to the liquid crystal capacitance (Cst/Clc) is set to 1.0, the peripheral length Lof of the pattern of the gate electrode to pixel electrode capacitor 123 in the non-continuity state is set to 5 $\mu$m, and the peripheral length Lst of the pattern of the storage capacitor 122 is set to a value within the range of from 342 $\mu$m to 687 $\mu$m. With these settings, flicker can be restricted within the allowable range. On the other hand, restriction of flicker has proved insufficient in the case of the prior art.

Next, there will be explained an example in which the peripheral length Lst of the pattern forming the storage capacitor 122 falls within the range of from 342 $\mu$m to 687 $\mu$m.

In the first embodiment, the peripheries of the patterns (the storage capacitor forming independent electrode 107 and the storage capacitor forming pixel electrode 131), which form the storage capacitor 122, are formed in irregular shape as shown in FIG. 3, thereby increasing the length of the peripheries. FIGS. 8, 10, 11 show the planar configurations of the storage capacitor forming independent electrode 107 and the storage capacitor forming pixel electrode 131, where Lst is 342 $\mu$m (corresponding to the minimum values (Dmin, Bmin) of the indexes D and B), where Lst is 500 $\mu$m (corresponding to the optimum values (1, Bopt) of the indexes D and B), and where Lst is 687 $\mu$m (corresponding to the maximum values (Dmax, Bmax) of the indexes D and B), respectively. The sectional structure of the storage capacitor 122 in these cases is comprised of, as shown in FIG. 9, an independent capacitance line; the storage capacitor forming independent electrode 107; a gate insulating film 11; a non-doped silicon film 7a and n+ doped silicon film 7b which serve as semiconductor films; the storage capacitor forming pixel electrode 131; a passivation insulating film 8; and the pixel electrode 4, these constituents having been successively laminated on the glass substrate 110. The storage capacitor forming pixel electrode 131 is connected to the pixel electrode 4 via the contact hole 9 which penetrates through the passivation insulating film 8. The storage capacitor forming pixel electrode 131 is formed so as to be one size larger than the storage capacitor forming independent electrode 107. For comparison purpose, FIG. 12 shows the configurations of the storage capacitor forming pixel electrode 131 and the storage capacitor forming independent electrode 107 of the prior art, where Lst is 150 μm. In FIGS. 8, 10, 11 and 12, the respective patterns of the films laminated on the glass substrate 110 (see FIG. 9) are perspectively illustrated with different kinds of lines (solid lines and broken lines different in thickness) to distinctly depict the edges of these film patterns. In FIG. 9, the contour of each film pattern is depicted by its corresponding line used in FIG. 8.

In the cases where Cst/Clc is 0.5 and where Cst/Clc is 1.5, the peripheral shapes of the storage capacitor forming pixel electrode 131 and the storage capacitor forming independent electrode 107 are formed similarly to the case described earlier, such that Lst takes the values corresponding to the minimum, optimum and maximum values of indexes D and B, whereby flicker can be restricted within the allowable range.

Therefore, at least in cases where Cst/Clc is within the range of from 0.5 to 1.5, flicker can be restricted within the allowable range by forming the LCD element such that the index B falls substantially within the range of from 11 to 37 while the index D falls substantially within the range of from 0.6 to 1.5 in accordance with the value of Cst/Clc.

As has been described above, in the present embodiment, flicker occurring in a relatively small liquid crystal panel can be restricted within the allowable range by use of the simple indexes D and B.

Second Embodiment

In the second embodiment of the invention, the pixel transistor is composed of a top-gate type TFT and D defined by $D=[Con/(Clc+Cst+Con)]\times[(Lst+Lon)/Lon]$ (Equation (7)) and B defined by $B=Lst/Lon$ (Equation (8)) are used as indexes for indicating how much the fluctuation of the feed-through voltage can be restricted. Except this point, the second embodiment is similar to the first embodiment.

Generally, typical TFTs formed from poly silicon are of the top-gate type and typical top-gate type TFTs have no overlapping parts where a gate electrode and a drain electrode are overlapped in a plan view. Therefore, top-gate type TFTs do not have the capacitance value Cof and pattern peripheral length Lof of the gate electrode to pixel electrode capacitor in the non-continuity state so that the indexes D and B determined by these values cannot be used. However, since the indexes D given by Equation (7) and the index B given by Equation (8) are defined by the capacitance value Con and pattern peripheral length Lon of the gate electrode to pixel electrode capacitor in the continuity state, these indexes may be used for indicating the degree of restriction on the fluctuation of the feed-through voltage, even when the pixel transistor is composed of a top-gate type TFT. When the inventors actually calculated the relationship between these indexes and the DC offset, substantially the same result as in the first embodiment was obtained. Although the second embodiment does not show an example of calculation for obtaining the relationship between each of the indexes and the DC offset, flicker occurring in comparatively small liquid crystal panels can be restricted within the allowable range by the second embodiment.

Third Embodiment

Figure 13:
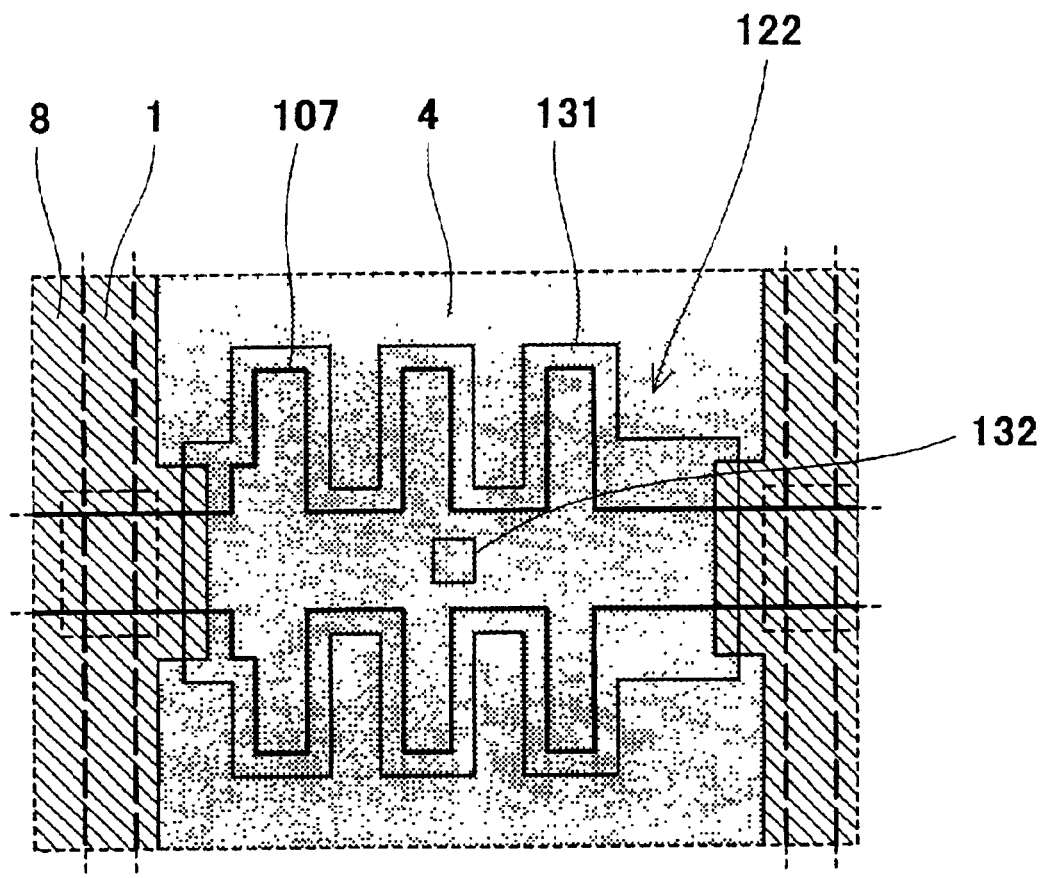
FIG. 13 shows a plan view of a structure of a pixel in an active matrix LCD element according to a third embodiment of the invention.

FIG. 13 shows a plan view of a structure of a pixel in an active matrix LCD element according to the third embodiment of the invention. In FIGS. 13 and 8, like or equivalent components are designated by like numerals.

In the transmissive type LCD element of the first embodiment shown in FIG. 8 for example, Lst is increased by making the periphery of the pattern of the storage capacitor 122 irregular. The area of the storage capacitor 122 in this case is the same as that of the prior art shown in FIG. 12 which has no pattern irregularity. However, provision of such irregularity reduces the aperture ratio compared to the prior art, in spite of the fact that the area of the storage capacitor 122 does not change. This is attributable to the presence of the storage capacitor forming pixel electrode 131. Referring to FIG. 9, the storage capacitor 122 can be formed without provision of the storage capacitor forming pixel electrode 131. In this case, the storage capacitor 122 is formed between the pixel electrode 4 and the storage capacitor forming pixel electrode 131. Since the capacitance in this case is formed not only through the gate insulating film 11 but also through the passivation insulating film 8, the gap between the electrodes constituting the storage capacitor 122 is large and, in consequence, capacitance per unit area becomes small. Therefore, there arises a need to increase the area of the storage capacitor forming independent electrode 107 to compensate for the small capacitance per unit area, which entails a drop in the aperture ratio. To avoid this, a method is usually taken in which the storage capacitor forming pixel electrode 131 is provided so as to be connected to the pixel electrode 4 through the contact hole 132 and the storage capacitor 122 is formed by the storage capacitor forming pixel electrode 131 and the storage capacitor forming independent electrode 107. With this arrangement, the storage capacitor 122 is formed only through the gate insulating film 11 so that a drop in the aperture ratio due to the decrease in capacitance per unit area can be prevented.

The above method, however, has revealed the following problem. The storage capacitor forming pixel electrode 131 needs to be somewhat larger than the storage capacitor forming independent electrode 107 and the area 131a of the storage capacitor forming pixel electrode 131, by which the storage capacitor forming pixel electrode 131 is larger than the storage capacitor forming independent electrode 107, increases in proportion to Lst. As a result, if Lst is prolonged as shown in FIG. 8, the area of the storage capacitor forming pixel electrode 131 increases by the amount corresponding to the prolonged portion and, in accordance with the increase, the aperture ratio decreases. Since transmissive type LCD elements require an aperture ratio no less than a certain value, the requirements for the indexes D and B discussed in the first embodiment cannot be satisfied. Accordingly, the requirements for the aperture ratio and for the level of flicker are incompatible with each other in some cases.

To solve this problem, the third embodiment provides a reflective type LCD element. More specifically, the pixel electrode is composed of a reflective film so that it also serves as a reflector 14 and the periphery of the pattern of the storage capacitor 122 has an irregular shape with prolonged Lst. By virtue of this arrangement, there is no need to take the aperture ratio into account and therefore the value of Lst can be easily set so as to make the value of the index D be 1 or make the value of the index B be Bopt. As a result, flicker can be restricted as much as possible.

Fourth Embodiment

Figure 14A:
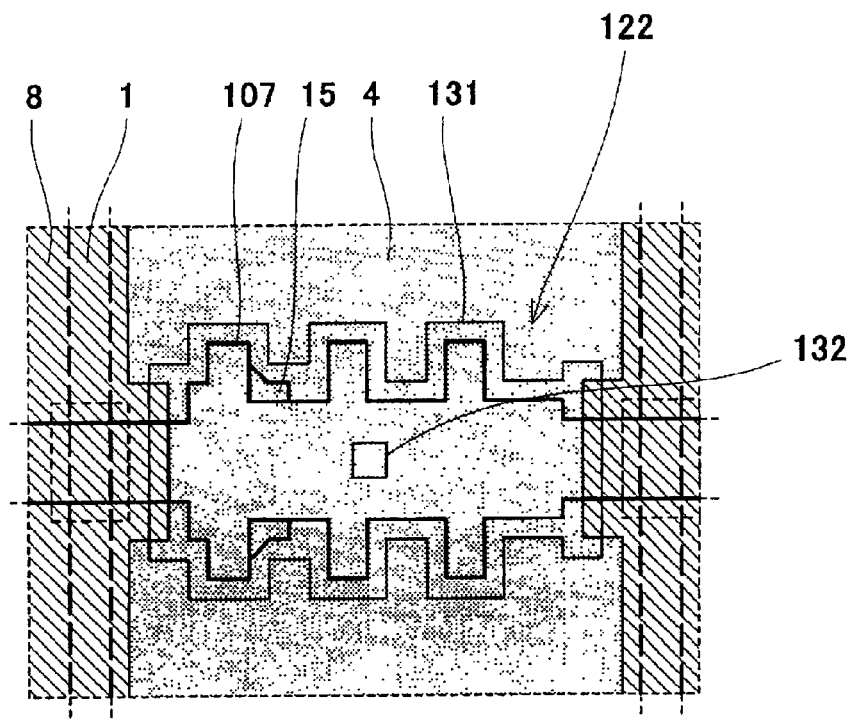
Figure 14B:
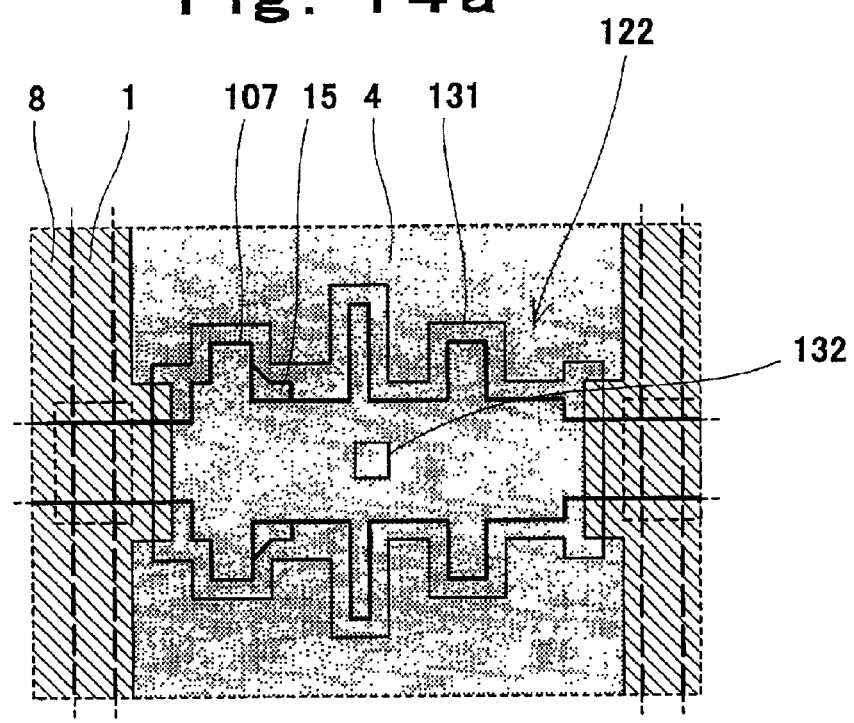

FIGS. 14a and 14b show plan views of structures of an active matrix LCD element according to the fourth embodiment of the invention. Specifically, FIG. 14a shows a structure of a pixel near by a terminal end of a gate signal, whereas FIG. 14b shows a structure of a pixel near by a supply end of the gate signal. In FIGS. 14a, 14b and 8, like or equivalent components are designated by like numerals.

The fourth embodiment provides an application of the invention, in which the recharging phenomenon is not negligible. The active matrix LCD element of the fourth embodiment has a large size (the diagonal length of the screen is 15 inches or more). As shown in FIGS. 14a and 14b, the storage capacitor forming independent electrode 107 is provided with a capacitance inclination correcting section 15 and the storage capacitor forming pixel electrode 131 is formed so as to be somewhat larger than the total of the storage capacitor forming independent electrode 107 and the capacitance inclination correcting section 15. The fourth embodiment is similar to the first embodiment except this point.

The capacitance inclination correcting section 15 is formed such that as the pixel to which the section 15 belongs is closer to the terminal end of the gate signal, the area of the section 15 is smaller. Therefore, a pixel closer to the terminal end of the gate signal has a smaller capacitance value Cst in its storage capacitor 122. Consequently, as seen from Equation (1), a pixel closer to the terminal end of the gate signal has a higher feed-through voltage Vts so that it becomes possible to compensate for the recharging voltage.

The values of the indexes D and B vary according to changes in the capacitance value Cst of the storage capacitor 122, as apparent from the assumption that Cst is a constant, this assumption being conditions for deriving D=[Cof/(Clc+Cst+Cof)]×[(Lst+Lof)/Lof] (Equation (5)) and B=Lst/Lof (Equation (6)). Thus, the value of Lst is also set, in accordance with changes in Cst, to a value which satisfies Dmin<D<Dmax and Bmin<B<Bmax which have been explained in the first embodiment. Concretely, as seen from FIGS. 14a and 14b, a pixel located nearer to the terminal end of the gate signal has a smaller value Lst. Therefore, even when capacitance inclination correction is done, the level of flicker can be restricted within the allowable range.

To compensate for the recharging voltage, capacitance inclination correction may be effected on Cof or Con of the pixel transistor instead of Cst. In this case, the area of the capacitance inclination correcting section in a pixel located closer to the terminal end of the gate signal may be simply made to be larger, as apparent from Equation (1), whereas Lst is made, similarly to the preceding case, to be smaller for a pixel closer to the terminal end of the gate signal.

Fifth Embodiment

FIGS. 15 to 20 are plan views each showing a structure of a pixel in an active matrix LCD element according to the fifth embodiment of the invention. In FIG. 3 and FIGS. 15 to 20, like or equivalent components are designated by like numerals. It should be noted that, as to the storage capacitor 122 in FIGS. 15 to 20, only the storage capacitor forming independent electrode 107 is shown, while the storage capacitor forming pixel electrode is omitted for the sake of simplicity. In these figures, the storage capacitor forming independent electrode 107 is indicated by solid line and hatched.

The fifth embodiment provides various planar configurations for the pattern forming the storage capacitor 122, these configurations having longer peripheral lengths Lst than the prior art.

Figure 15:
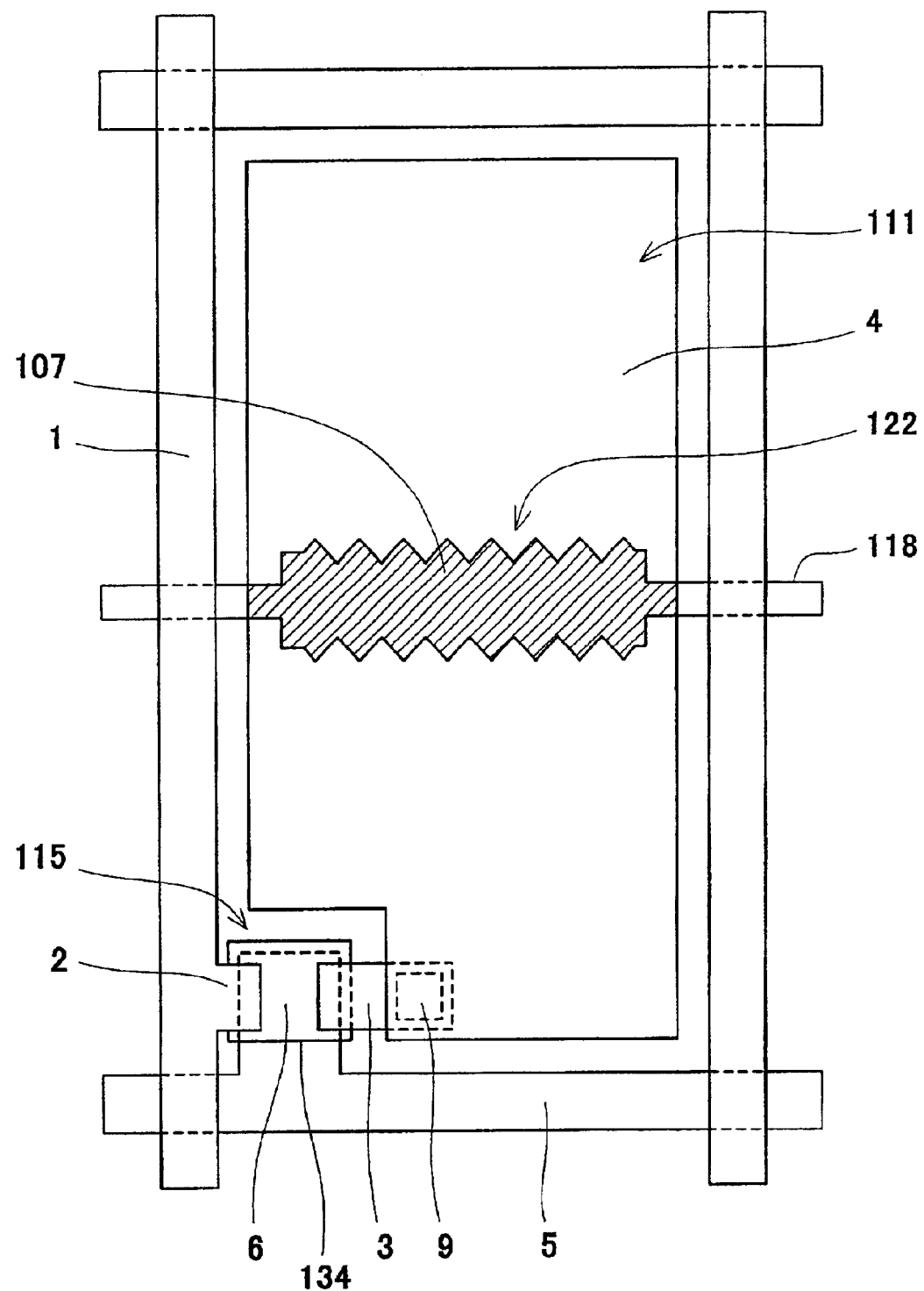
FIG. 15 is a plan view of a structure of a pixel of an active matrix LCD element according to a fifth embodiment of the invention.
Figure 16:
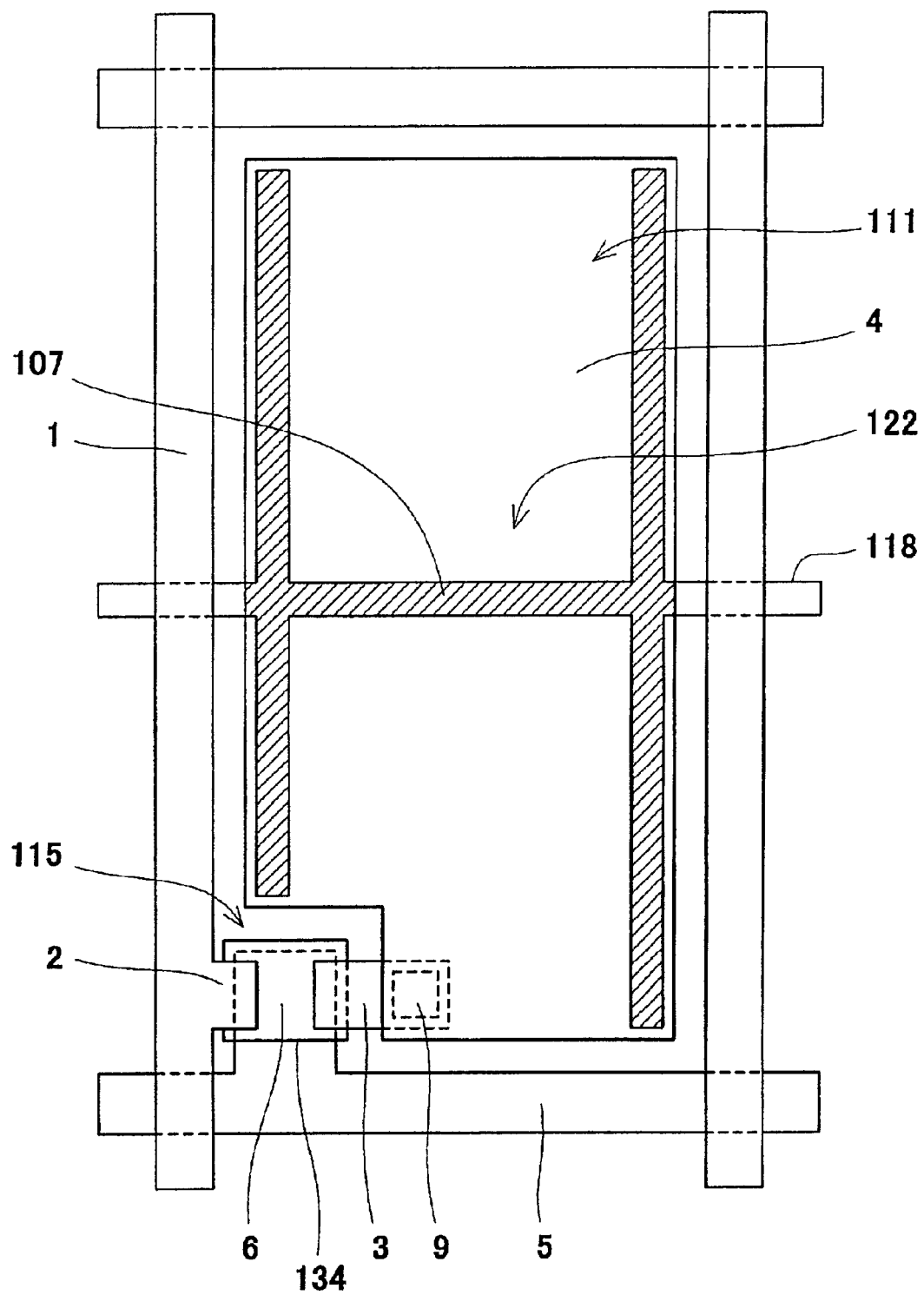
FIG. 16 is a plan view of another structure of a pixel of the active matrix LCD element according to the fifth embodiment of the invention.
Figure 17:
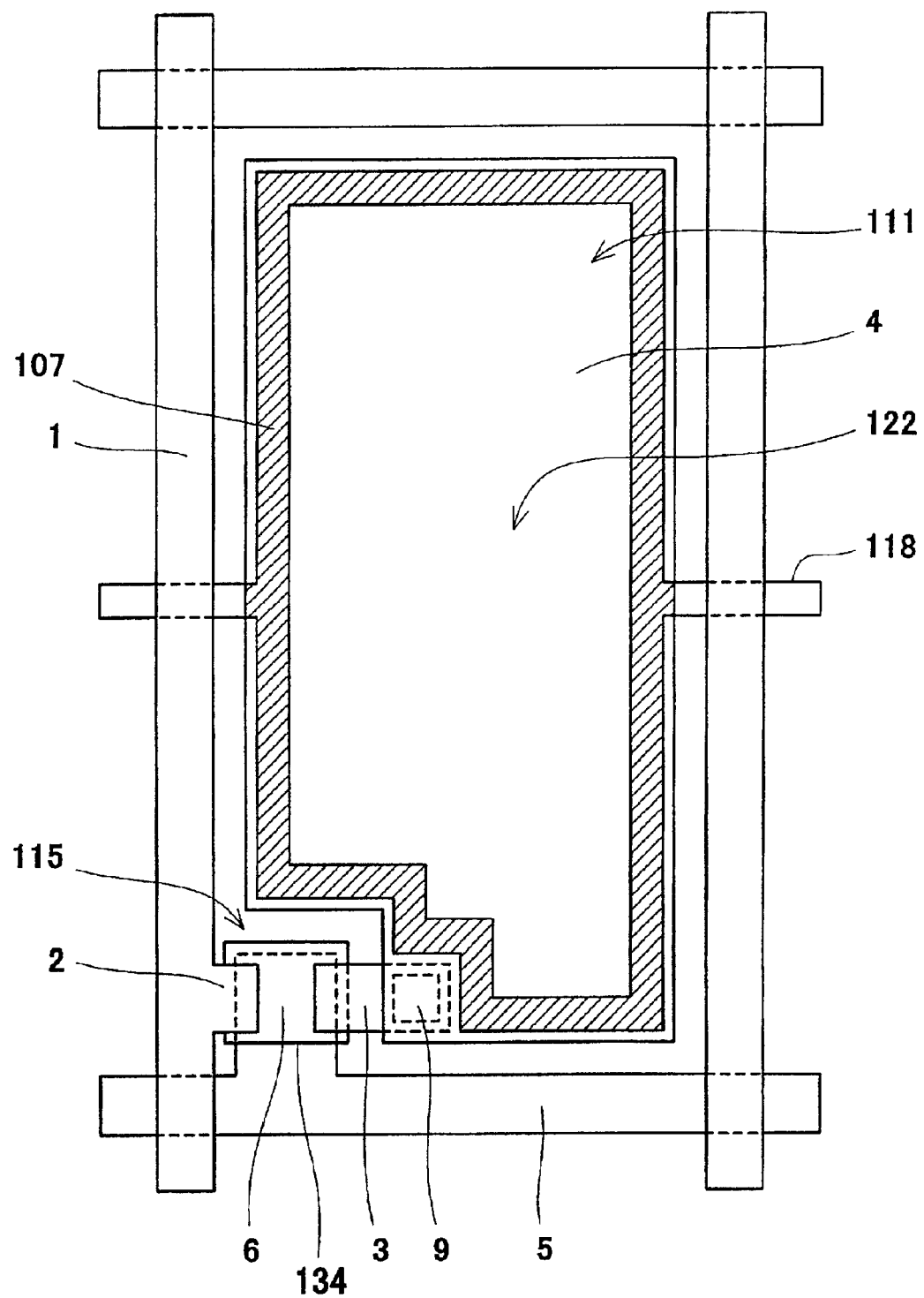
FIG. 17 is a plan view of another structure of a pixel of the active matrix LCD element according to the fifth embodiment of the invention.
Figure 18:
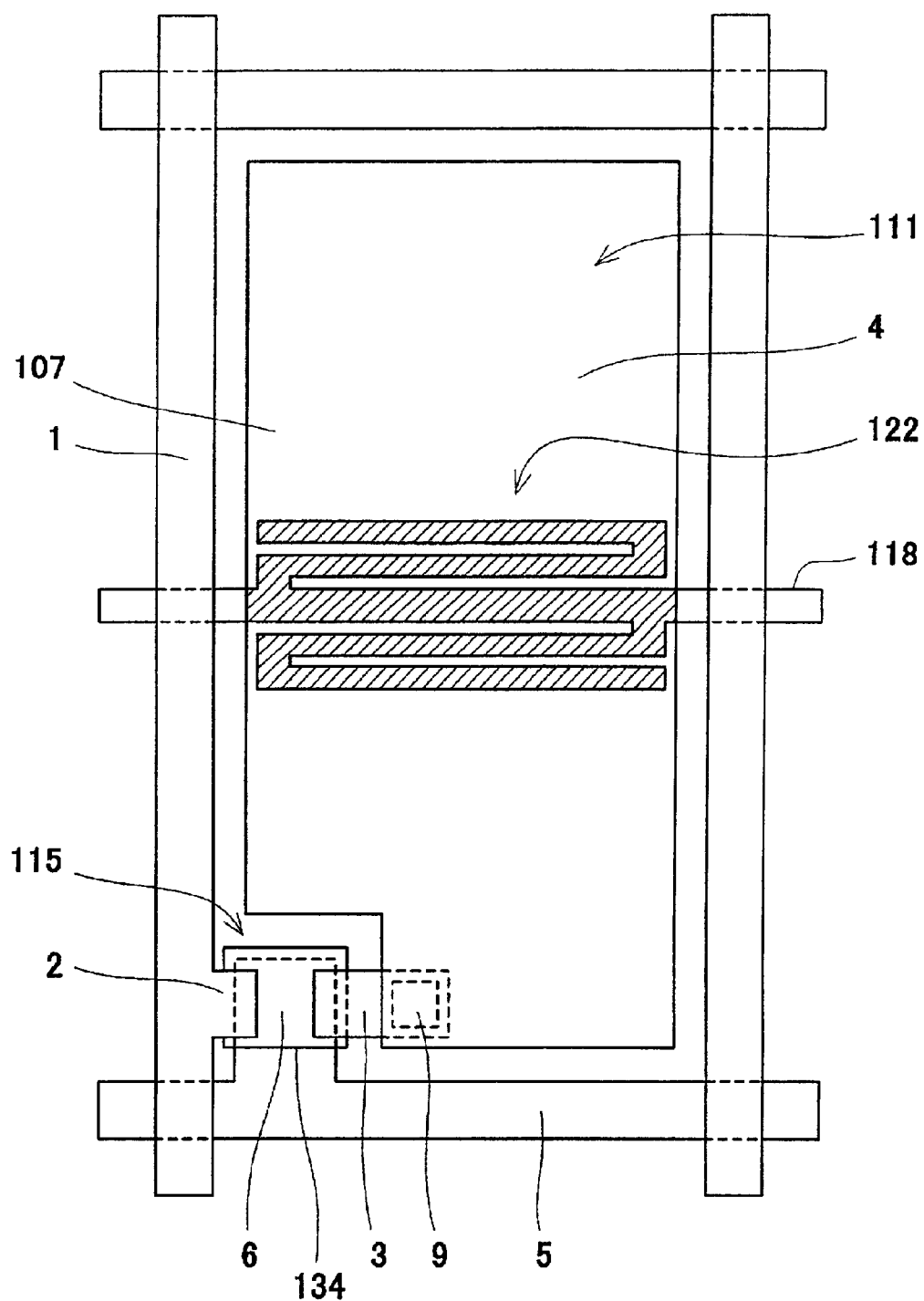
FIG. 18 is a plan view of another structure of a pixel of the active matrix LCD element according to the fifth embodiment of the invention.
Figure 19:
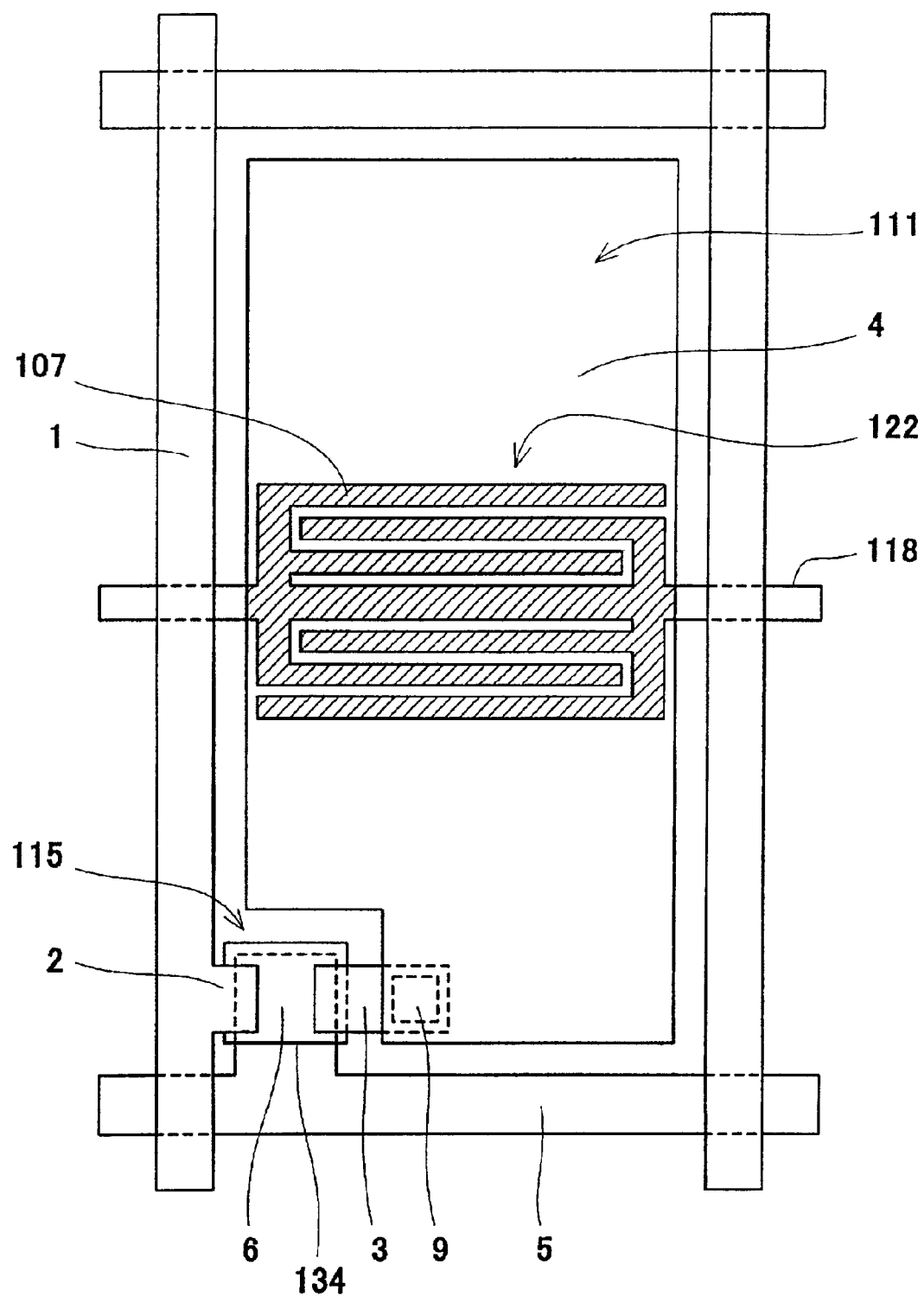
FIG. 19 is a plan view of another structure of a pixel of the active matrix LCD element according to the fifth embodiment of the invention.
Figure 20:
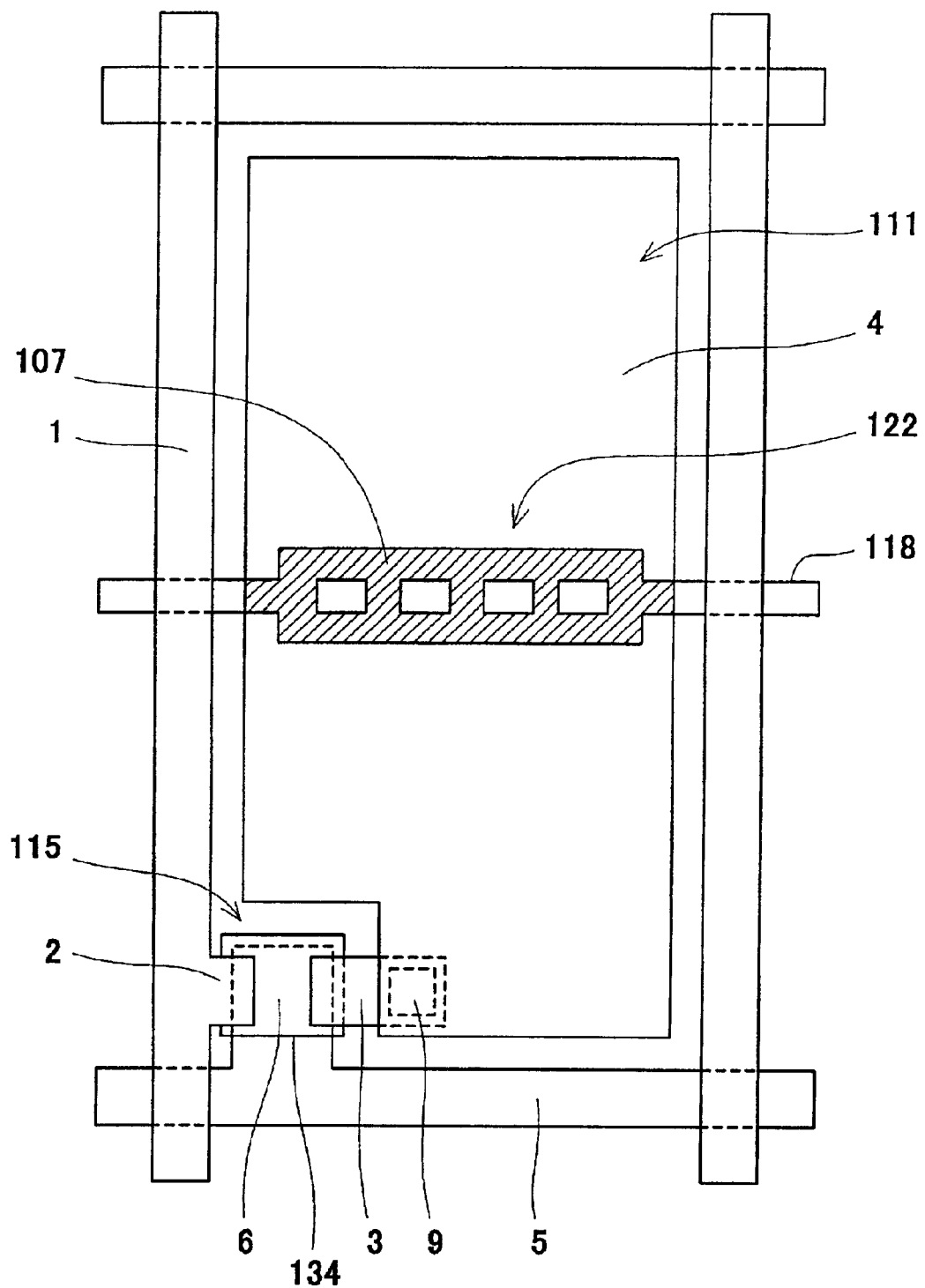
FIG. 20 is a plan view of another structure of a pixel of the active matrix LCD element according to the fifth embodiment of the invention.

As effective planar configurations having longer peripheral lengths Lst, there are proposed, in addition to the irregular shape having rectangular projections as shown in FIG. 8, saw teeth shapes such as shown in FIG. 15, H-letter shapes such as shown in FIG. 16, annular shapes such as shown in FIG. 17, meander patterns such as shown in FIG. 18, comb-like shapes such as shown in FIG. 19, and hole shapes such as shown in FIG. 20. When the storage capacitor forming independent electrode 107 is formed into an H-letter shape as shown in FIG. 16 or an annular shape as shown in FIG. 17, it can be partly lapped over a black matrix, so that the aperture ratio can be increased and an electric field shielding effect on the source line 1 can be obtained.

Six Embodiment

Figure 21A:
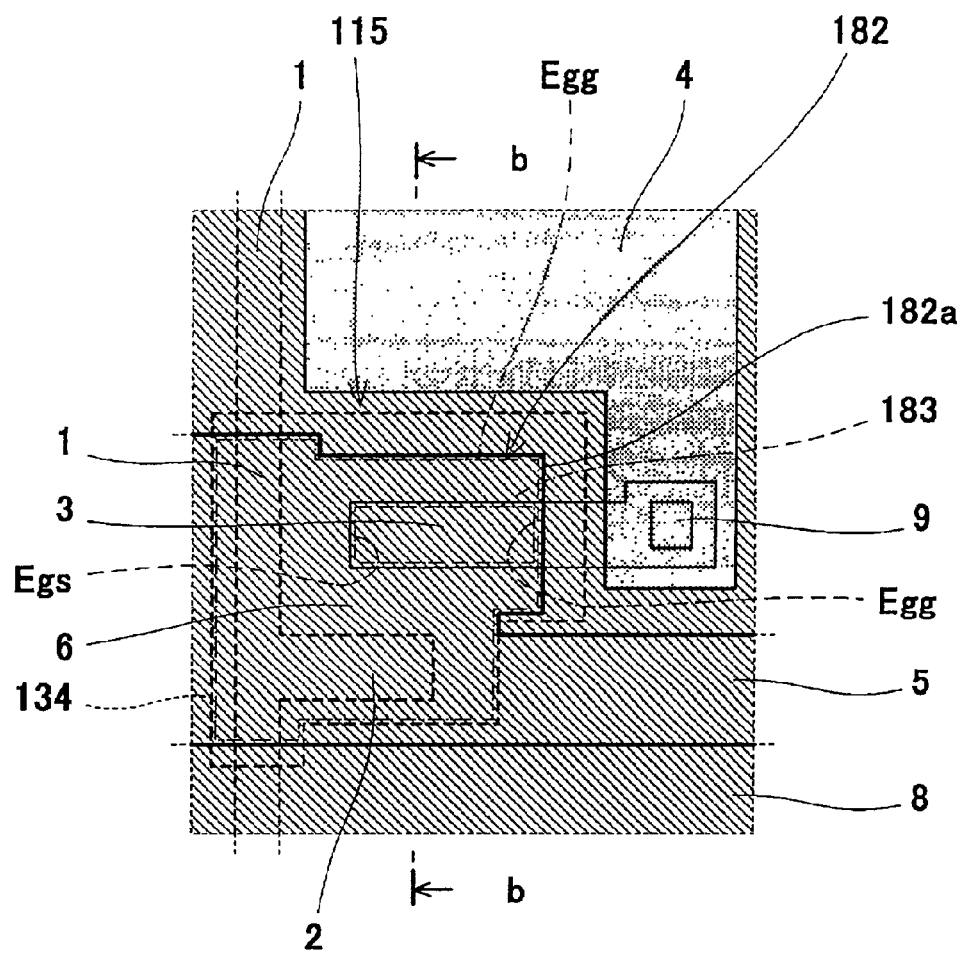
Figure 21B:
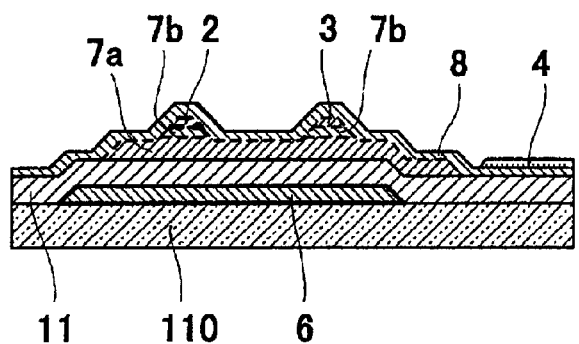
Figures 22A, 22B:
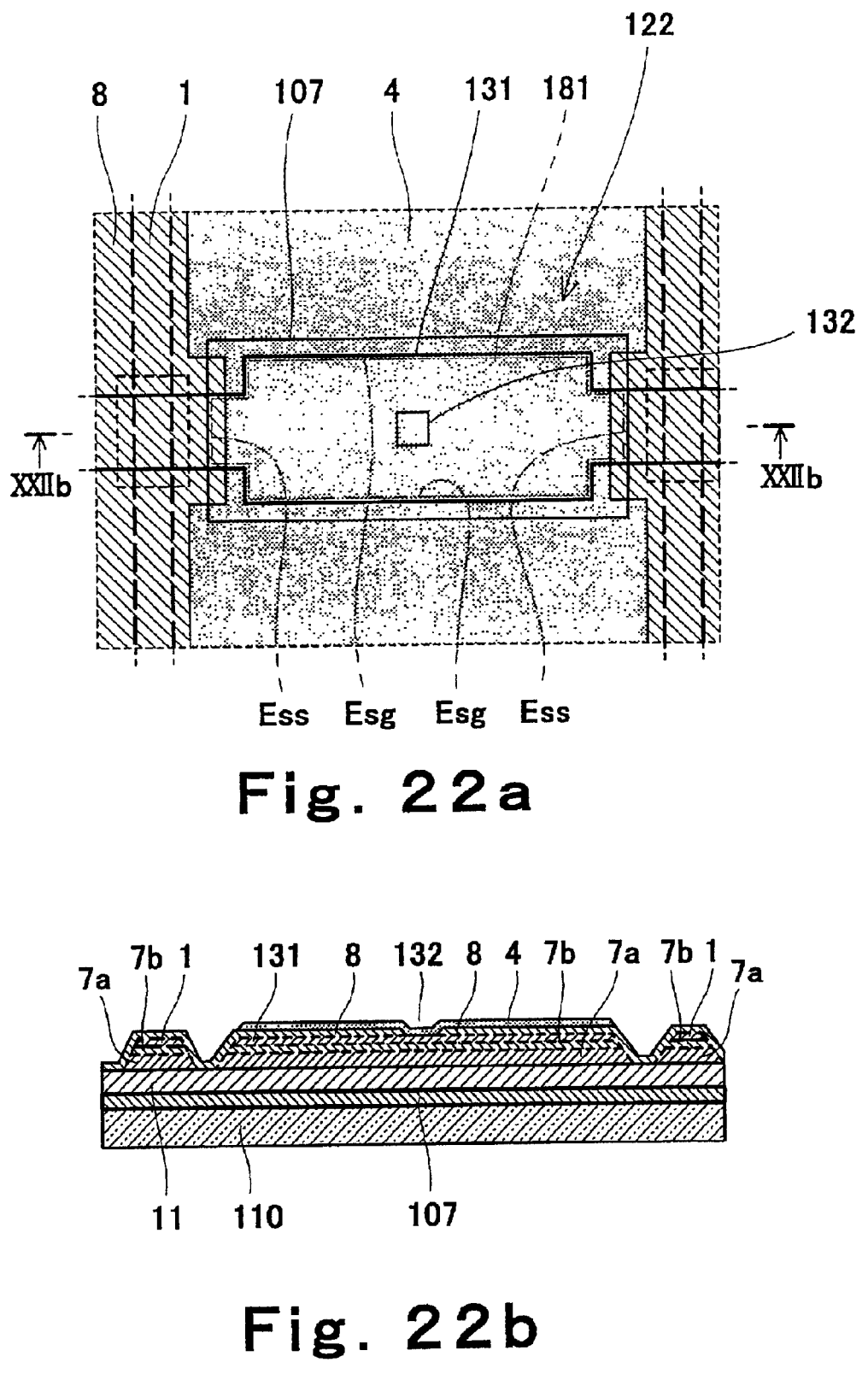
Figure 23A:
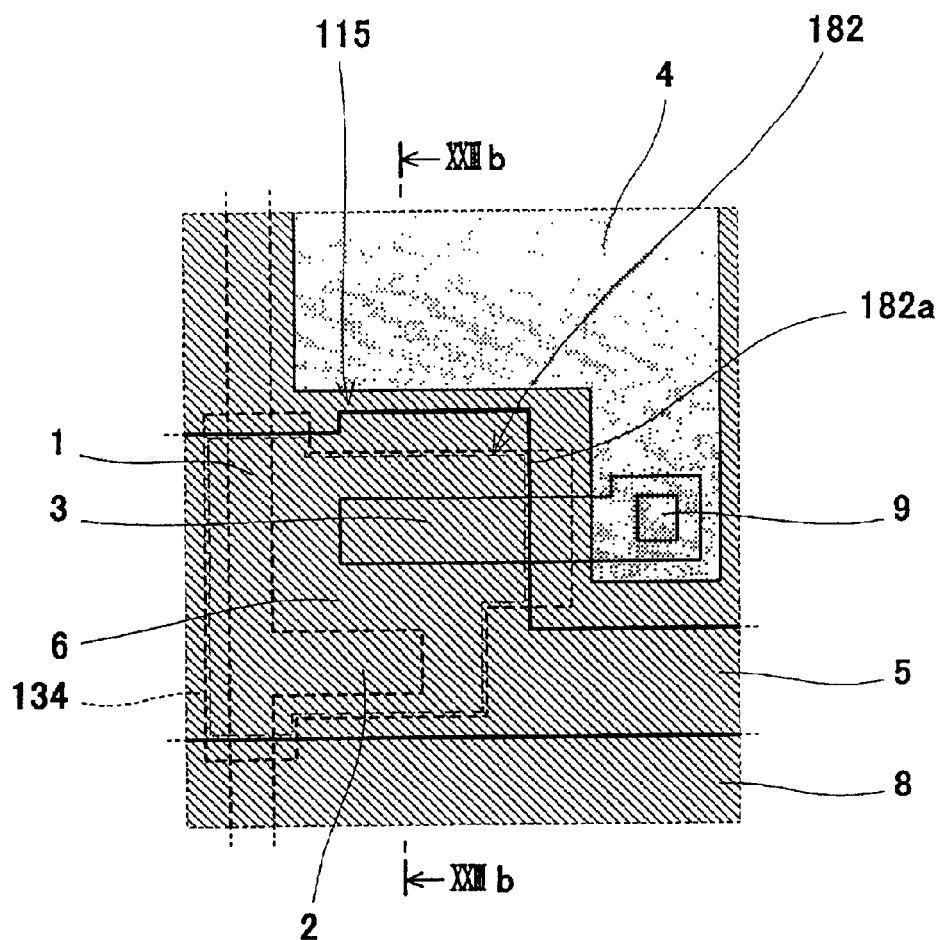
Figure 23B:
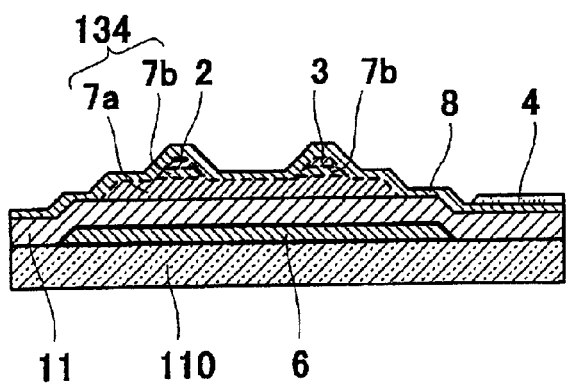
Figure 24A:
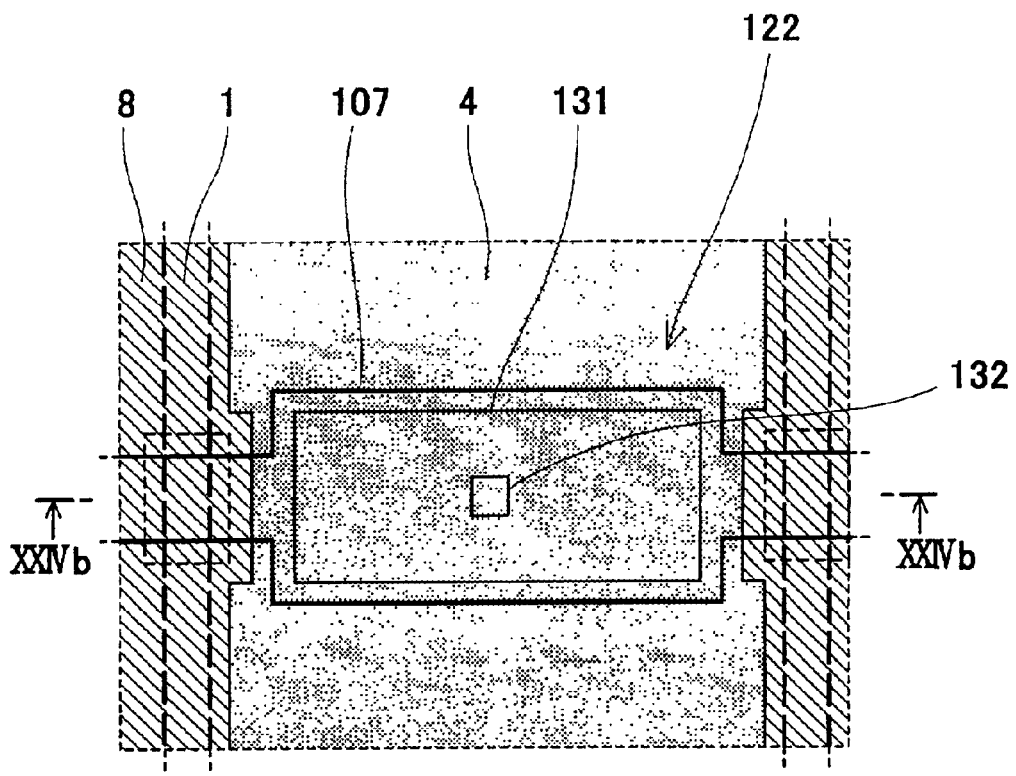
Figure 24B:
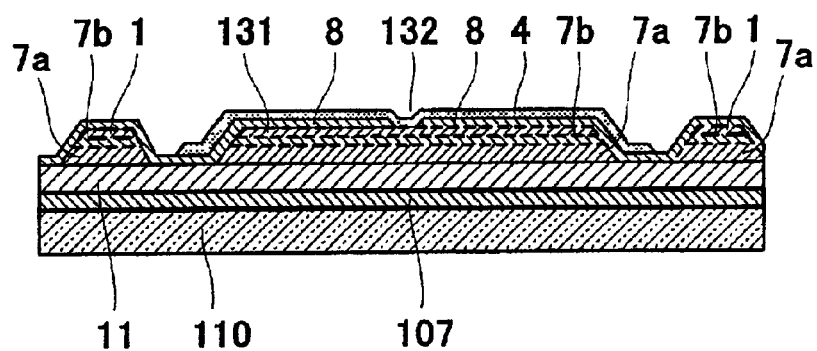

FIGS. 21a and 21b show a structure of a pixel transistor in an active matrix LCD element according to the six embodiment of the invention, FIG. 21a being a plan view whereas FIG. 21b is a sectional view taken along line XXIb—XXIb of FIG. 21a. FIGS. 22a and 22b show a structure of a storage capacitor in the active matrix LCD element according to the six embodiment of the invention, FIG. 22a being a plan view while FIG. 22b is a sectional view taken along line XXIIb—XXIIb of FIG. 22a. FIGS. 23a and 23b show a structure of a conventional pixel transistor, FIG. 23a being a plan view while FIG. 23b is a sectional view taken along line XXIIIb—XXIIIb of FIG. 23a. FIGS. 24a and 24b show a structure of a conventional storage capacitor, FIG. 24a being a plan view while FIG. 24b is a sectional view taken along line XXIVb—XXIVb of FIG. 24a. In FIGS. 21a, 22a, 23a and 24a, the respective patterns of the films laminated on a glass substrate are perspectively illustrated with different kinds of lines to distinctly depict the edges of these film patterns. In FIGS. 21b, 22b, 23b and 24b, the contour of each film pattern is depicted by its corresponding line used in FIGS. 21a, 22a, 23a and 24a.

In the six embodiment, the number of patterns having edges which define the gate electrode to pixel electrode capacitor of the pixel transistor and the number of patterns having edges which define the storage capacitor are respectively limited to a minimum but sufficient number.

First, the gate electrode to pixel electrode capacitor of the pixel transistor will be explained. In FIGS. 23a and 23b, when the pixel transistor 115 is in its continuity state, a channel region is formed in the semiconductor 134, functioning as a conductor, so that the semiconductor 134 and the gate electrode 6 become films substantially forming the gate electrode to pixel electrode capacitor in the continuity state. In the prior art, the edges of the patterns, which define a portion 182a (located along the pixel electrode 4) of the periphery 182 of the gate electrode to pixel electrode capacitor in the continuity state, are constituted by the edge of the pattern of the film (gate electrode film) of the gate electrode 6 and the edges of the pattern of the semiconductor films 7a, 7b of the semiconductor 134.

According to the sixth embodiment, since the periphery of the gate electrode 6 is located, as shown in FIGS. 21a and 21b, inside the periphery of the semiconductor 134 in the area where the pixel transistor 115 extends along the pixel electrode 4, the edge of the pattern which define the portion 182a of the periphery 182 of the gate electrode to pixel electrode capacitor in the continuity state are composed of only the edge of the pattern of the gate electrode 6. It should be noted herein the portion 182a is located along the pixel electrode 4.

Next, the storage capacitor will be explained. Referring to FIGS. 23a, 23b, 24a, 24b, the prior art is formed such that the storage capacitor forming independent electrode 107 is located outside the storage capacitor forming pixel electrode 131 in a plan view, and therefore, the edges of the pattern which define the periphery of the storage capacitor 122 are composed of the edges of the patterns of three electrodes, namely, the storage capacitor forming independent electrode 107 formed from the gate electrode film; the storage capacitor forming pixel electrode 131 formed from the film (drain electrode film) constituting the source line 1; and the pixel electrode 4.

On the other hand, the six embodiment is formed such that since the storage capacitor forming independent electrode 107 is located inside the storage capacitor forming pixel electrode 131 as shown in FIGS. 22a and 22b, the edges of the patterns which define the periphery of the storage capacitor 122 are composed of the edges of the patterns of two electrodes, namely, the storage capacitor forming independent electrode 107 formed from the gate electrode film; and the storage capacitor forming pixel electrode 131 formed from the drain electrode film.

The above arrangement can restrict increases in the fluctuation of the feed-through voltage due to processing variations in the respective patterns of the films formed on the glass substrate 110.

Specifically, the factors that cause variations in the semiconductor films 7a, 7b are eliminated to prevent variations associated with the gate electrode to pixel electrode capacitor when the pixel transistor 115 is in its continuity state, whereas the factors that cause variations in the pixel electrode 4 are eliminated to prevent variations associated with the storage capacitor 122.

In this arrangement, the respective peripheries 182, 183 of the gate electrode to pixel electrode capacitor 123 in the continuity state and in the non-continuity state and the periphery of the storage capacitor 122 are respectively composed of the edges of the patterns of two films, that is, the gate electrode film and the drain electrode film. Therefore, the ratio between the length of an edge Esg of the pattern composed of the gate electrode film and the length of an edge Esd of the pattern composed of the drain electrode film is made to be equal to the ratio between an edge Egg of the pattern composed of the gate electrode film and an edge Egd of the pattern composed of the drain electrode film, whereby the edges Esg, Egg of the pattern composed of the gate electrode film vary similarly and the edges Esd, Egd of the pattern composed of the drain electrode film vary similarly as understood from Equation (3), so that the influence of variations in the pattern dimensions upon the feed-through voltage Vts can be eliminated. Note that the edges Esg, Esd are among the edges of the pattern that constitute the periphery 181 of the storage capacitor 122, whereas the edges Egg, Egd are among the total of the edges of the pattern that constitute the periphery 182 of the gate electrode to pixel electrode capacitor in the continuity state and the edges of the pattern that constitute the periphery 183 of it in the non-continuity state. As a result, flicker can be restricted to a lower level. It is apparent that Lst in FIGS. 22a and 22b may be prolonged similarly to the first embodiment.

Seventh Embodiment

The seventh embodiment is associated with an active matrix LCD element in which variations in the feed-through voltage are cancelled by a source signal or gate signal.

Figure 25:
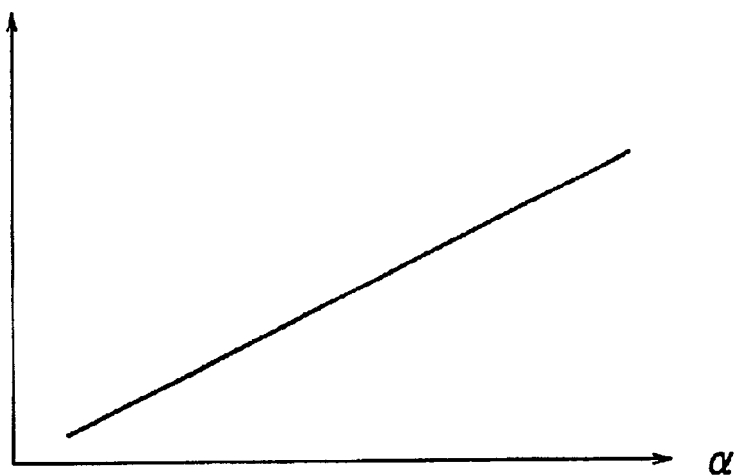
FIG. 25 shows a plot of feed-through voltage verses $\alpha$.
Figure 26:
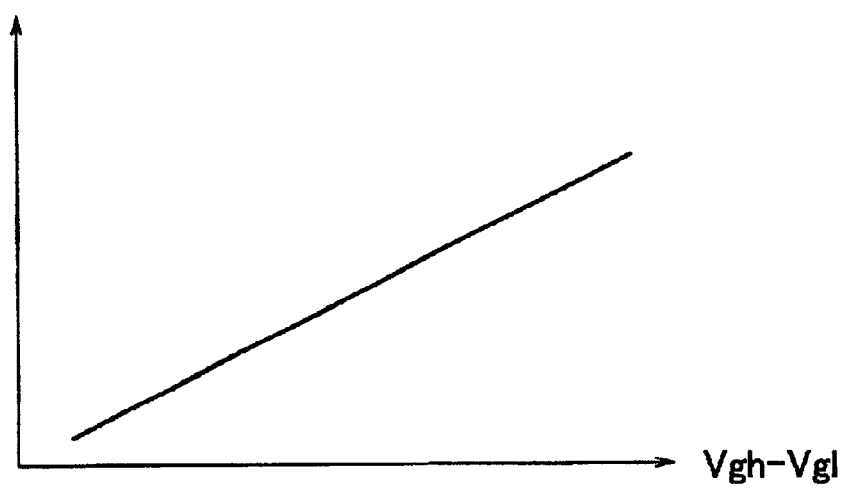
FIG. 26 shows a plot of feed-through voltage verses (Vgh−Vgl).

FIG. 25 shows a plot of the feed-through voltage verses $\alpha$. FIG. 26 shows a plot of the feed-through voltage verses (Vgh−Vgl).

As has been described in the introduction of "the preferred embodiments of the invention", where gate on voltage is Vgh, gate off voltage is Vgl, the threshold voltage of the pixel transistor is Vt, the center voltage of a source signal is Vsc, $\alpha$=Vgh−(Vsc+Vt), $\beta$=(Vsc+Vt)−Vgl, and $\tau$=$\beta$/$\alpha$, the feed-through voltage Vts is approximated as follows.

$$Vts=[(Con+\tau Cof)/(Clc+Cst+Cof)]\alpha$$

From this equation, it is understood that the feed-through voltage Vts is proportional to $\alpha$. Further, the feed-through voltage Vts can be made to be constant by arranging the capacitance values Con, Cof and Cst such that (Con+$\tau$Cof)/(Clc+Cst+Cof) is constant for variations in these capacitance values. However, if it is presumable that variations in (Con+$\tau$Cof) (Clc+Cst+Cof) caused by variations in each capacitance value has a certain tendency within the screen, the feed-through voltage Vts can be made to be constant by independently setting Vsc or Vgh and Vgl for each of the columns or rows of the pixel matrix such that the tendency can be cancelled. There are some cases where $\alpha$ and $\beta$ are substantially equal to each other in the above equation that gives the feed-through voltage. In such cases, Vts can be further approximated and described by Vts=[(Con+Cof)/(Clc+Cst+Cof)]$\alpha$. With this equation, although the approximation error increases, there is such an advantage that the voltage parameter is not included in the term of the capacitance ratio and therefore, setting can be easily done when correcting the feed-through voltage. The feed-through voltage Vst may be further approximated by the following equation without consideration of Con.

$$Vts=[Cof/(Clc+Cst+Cof)](Vgh-Vgl)$$

As seen from FIG. 26, the feed-through voltage Vts is proportional to (Vgh−Vgl) in this case. This equation further increases the approximation error and has the disadvantage that variations in the lateral direction (the direction along the gate line) of the screen cannot be corrected as the feed-through voltage cannot be corrected by the source potential. However, it advantageously facilitates setting for the correction because there is no need to consider the value Vt and its variations.

Figure 27:
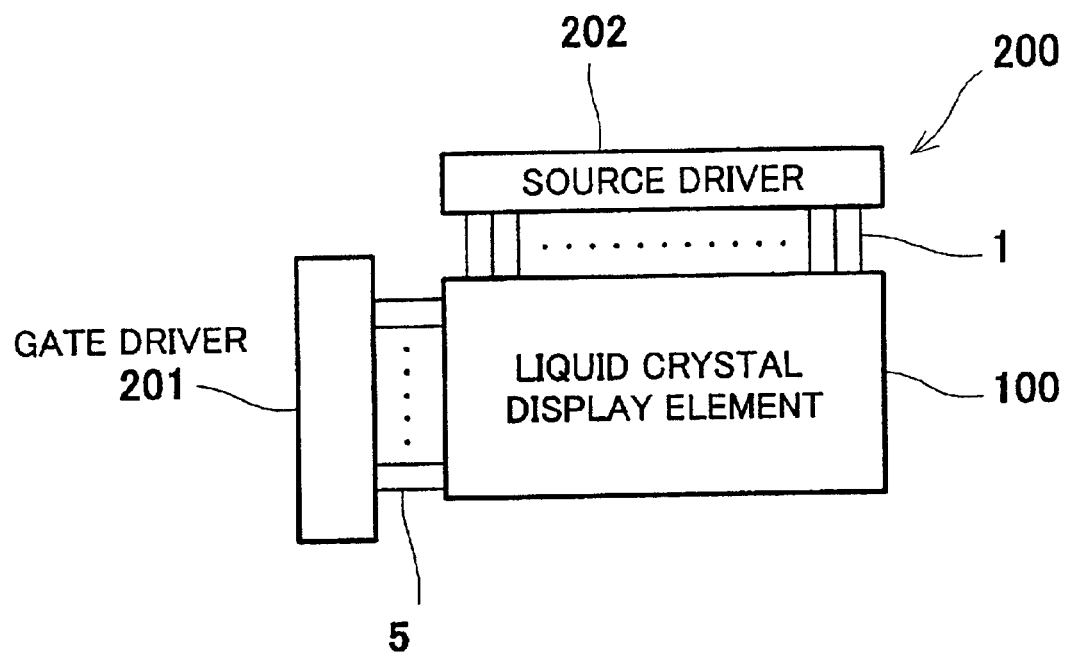
FIG. 27 is a block diagram schematically showing a structure of an active matrix LCD element according to a seventh embodiment of the invention.

FIG. 27 is a block diagram schematically showing a structure of an active matrix liquid crystal display according to the seventh embodiment of the invention. In FIG. 27 and FIGS. 1a and 1b, like or equivalent components are designated by like numerals. The active matrix liquid crystal display 200 of the seventh embodiment is designed such that a gate driver 201 and a source driver 202 output a gate signal and a source signal such as described earlier to the gate lines 5 and the source lines 1, respectively. With this arrangement, the above-discussed effects can be attained. It should be noted that an illuminator for supplying display light to the active matrix LCD element 100 is not shown in FIG. 27.

While the storage capacitor is formed between the independent storage electrode (i.e., the storage capacitor forming independent electrode) in which the storage capacitor is connected to the independent capacitance line and the pixel electrode (i.e., the storage capacitor forming pixel electrode) in the first to six embodiments, it may be formed between the front gate line and the pixel electrode.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An active matrix liquid crystal display element comprising:

a plurality of source lines for transmitting a video signal;

a plurality of gate lines arranged so as to intersect the plurality of source lines in a plan view, for transmitting a gate signal;

a plurality of pixels defined by the plurality of source lines and the plurality of gate lines which intersect each other and constituting an image display plane;

a pixel electrode provided for every pixel;

an opposed electrode facing the pixel electrode across a liquid crystal layer;

a storage capacitor provided for every pixel for holding a voltage applied between its corresponding pixel electrode and the opposed electrode; and a pixel transistor provided for every pixel, having a source electrode, a drain electrode and a gate electrode which are connected to a corresponding one of the source lines, a corresponding one of the pixel electrodes and a corresponding one of the gate lines respectively, and being turned ON or OFF by the gate signal, wherein an index B given by B=Lst/Lgd is equal to or greater than 7, where a periphery length of the storage capacitor is Lst and a periphery length of a gate electrode to pixel electrode capacitor, which is a capacitor formed between the gate electrode of the pixel transistor and the pixel electrode, is Lgd.

2. An active matrix liquid crystal display element according to claim 1, wherein the index B substantially ranges from 11 to 37.

3. An active matrix liquid crystal display element according to claim 1, wherein a periphery length Lof of the gate electrode to pixel electrode capacitor when the pixel transistor is in its non-continuity state is used as said Lgd and the index B is given by B=Lst/Lof.

4. An active matrix liquid crystal display element according to claim 1, wherein a periphery length Lon of the gate electrode to pixel electrode capacitor when the pixel transistor is in its continuity state is used as said Lgd and the index B is given by B=Lst/Lon.

5. An active matrix liquid crystal display element according to claim 1, which is a reflective type liquid crystal display element wherein the pixel electrode is composed of a reflecting film.

6. An active matrix liquid crystal display element according to claim 1, wherein at least either the capacitance value of the storage capacitor or the capacitance value of the gate electrode to pixel electrode capacitor is set according to positions along the gate lines of the image display plane, and wherein the index B is set according to said setting.

7. An active matrix liquid crystal display element according to claim 1, wherein at least a portion of the periphery of at least one of electrodes which constitute the storage capacitor has an irregular rectangular shape in a plan view.

8. An active matrix liquid crystal display element according to claim 1, wherein at least a portion of the periphery of at least one of electrodes which constitute the storage capacitor has a saw teeth shape in a plan view.

9. An active matrix liquid crystal display element according to claim 1, wherein at least one of electrodes which constitute the storage capacitor has an H-letter shape in a plan view.

10. An active matrix liquid crystal display element according to claim 1, wherein at least one of electrodes which constitute the storage capacitor has an annular shape in a plan view.

11. An active matrix liquid crystal display element according to claim 1, wherein at least one of electrodes which constitute the storage capacitor has a meander shape in a plan view.

12. An active matrix liquid crystal display element according to claim 1, wherein at least one of electrodes which constitute the storage capacitor has a comb shape in a plan view.

13. An active matrix liquid crystal display element according to claim 1, wherein at least one of electrodes which constitute the storage capacitor is holed in a plan view.

14. An active matrix liquid crystal display element according to claim 1, wherein the pixel transistor is placed at a corner of its corresponding pixel in a plan view, wherein the pixel electrode occupies a large part of its corresponding pixel, with a gap between the pixel electrode and the pixel transistor, and wherein the periphery of the gate electrode is located inside the periphery of a channel forming semiconductor within a portion of the pixel transistor which portion extends along the pixel electrode.

15. An active matrix liquid crystal display element according to claim 1, wherein the storage capacitor is formed between a storage capacitor forming pixel electrode and a storage capacitor forming independent electrode, the storage capacitor forming pixel electrode being connected to its corresponding pixel electrode, the storage capacitor forming independent electrode being connected to an independent capacitance line and facing the storage capacitor forming pixel electrode across an insulating layer, and wherein at least a portion of the periphery of the storage capacitor forming independent electrode is located inside the periphery of the storage capacitor forming pixel electrode in a plan view.

16. An active matrix liquid crystal display element according to claim 1, wherein the ratio between the length of an edge of the pattern of a film that constitutes the gate electrode and the length of an edge of the pattern of a film that constitutes the drain electrode, which edges are among edges of patterns that constitute the periphery of the storage capacitor, is equal to the ratio between the length of an edge of the pattern of the film that constitutes the gate electrode and the length of an edge of the pattern of the film that constitutes the drain electrode, which edges are among edges of patterns that constitute the periphery of the gate electrode to pixel electrode capacitor when the pixel transistor is in its continuity state and edges of the patterns that constitute the periphery of the gate electrode to pixel electrode capacitor when the pixel transistor is in its non-continuity state.

* * * * *